United States Patent [19]

Henrion

[11] Patent Number: 5,301,192
[45] Date of Patent: Apr. 5, 1994

[54] TEMPORARY INFORMATION STORAGE SYSTEM COMPRISING A BUFFER MEMORY STORING DATA STRUCTURED IN FIXED OR VARIABLE LENGTH DATA BLOCKS

[75] Inventor: Michel Henrion, Zaventem, France

[73] Assignee: Alcatel N.V., Amsterdam, Netherlands

[21] Appl. No.: 756,230

[22] Filed: Aug. 30, 1991

[30] Foreign Application Priority Data

Aug. 31, 1990 [FR] France .................. 90 10877

[51] Int. Cl.[5] ............................. H04J 3/24
[52] U.S. Cl. .................................... 370/94.1
[58] Field of Search .......... 370/94.1, 60, 61, 58.2, 370/108, 84, 32

[56] References Cited

U.S. PATENT DOCUMENTS

| | | | |
|---|---|---|---|
| 4,499,576 | 2/1985 | Fraser | 370/94.1 |
| 4,933,932 | 6/1990 | Quinquis et al. | 370/60 |
| 5,041,971 | 8/1991 | Carvey et al. | 370/94.1 |

FOREIGN PATENT DOCUMENTS

| | | |
|---|---|---|
| 0299473 | 1/1989 | European Pat. Off. . |
| 0323310 | 7/1989 | European Pat. Off. . |
| 8900942 | 8/1989 | European Pat. Off. . |
| 2549673 | 1/1985 | France . |
| 9000365 | 5/1990 | France . |

Primary Examiner—Douglas W. Olms
Assistant Examiner—Shick Hom
Attorney, Agent, or Firm—Robbins, Berliner & Carson

[57] ABSTRACT

This system stores data blocks each comprising one or more data elements. It comprises a plurality of queues serving to interlink the data blocks in order to transfer them selectively to individual outlets that may belong to separate destinations and a management logic for these queues. There is a queue specific to each outgoing destination. A queue management logic comprises data block selection (OSQRCL) acting when a queued data block must be assigned to an individual outlet, which comprise (OQSC, OQPS, OQIC) identifying a queue of an outgoing destination to which this outlet belongs, by obtaining the address of a data block and assigning the selected data to the outlet in question (YJS) by initiating the transfer of this data block to this individual outlet (NCO).

37 Claims, 10 Drawing Sheets

TEMPORARY INFORMATION STORAGE SYSTEM COMPRISING A BUFFER MEMORY STORING DATA STRUCTURED IN FIXED OR VARIABLE LENGTH DATA BLOCKS

TECHNICAL FIELD

This invention relates to a temporary information storage system comprising a buffer memory storing data structured as fixed or variable length data blocks, each comprising one or more data elements, a plurality of queues serving to interlink the data blocks in order to transfer them selectively to individual outlets that may belong to separate destinations and a management logic for these queues.

Reference is also made to Applicant's commonly assigned International Application designating the United States and entitled MULTIPLE PATH, SELF-ROUTING SWITCHING NETWORK FOR SWITCHING ASYNCHRONOUS TIME DIVISION MULTIPLEX CELLS filed on May 23, 1990 under Ser. No. PCT/FR90/00365, which relates to an ATM cell switching network in which the data temporary storing system of the present invention may find particular utility. To the extent such copending application may contain any additional information that might be of any assistance in the use and understanding of the invention claimed herein, it is hereby incorporated by reference.

BACKGROUND ART

Such a storage system, in conjunction with inlets associated with the buffer memory, constitutes a data switching device in which the data received by the inlets is stored in the buffer memory for subsequent forwarding to the outlets, according to selection indications. These selection indications may more generally denote an outgoing destination; they can accompany the data received by the inlets, or be included in this data and will serve to direct its transfer to at least one outlet of a selected outgoing destination. This switching device will be of use in communication networks. But the storage system of the invention, as such, can find many other applications, whenever data structured in data blocks comprising one or more data elements must be made available to multiple outlets belonging to separate destinations. In an expert system, for example, such a storage system can serve to store data to be processed and to submit this data to multiple processors. Several processors accomplishing a particular process in parallel will then be equivalent to an outgoing destination.

In a known embodiment, described in Applicant's commonly assigned U.S. patent application entitled COMMUNICATION SWITCHING ELEMENT AND METHOD FOR TRANSMITTING VARIABLE LENGTH CELLS filed on Aug. 9, 1990 under Ser. No. 565,310 and corresponding to International application. The storage system comprises one queue for each outlet. The function of the queue management logic (or system) is to add the identity of each data block (or cell) stored in the buffer memory, when it is to be transferred to an outgoing destination, to a queue of a selected outlet belonging to a destination, the process being repeated for one or more selected destinations. One outlet of those which belong to a particular outgoing direction is selected for example at random.

The advantage of such a solution lies in its apparent simplicity. When an outlet becomes available it simply serves its own outlet queue which transfers to it the identity of a data block in the buffer memory which is addressed to it.

However, each outlet must deal with the transfers for which it is asked by its queue, that is which have previously been assigned to it, without regard for its present situation which may be unfavorable with respect to such traffic (overload, failure, under maintenance, etc). In addition, queue entry takes no account of the traffic load already assigned to an outlet nor does it take into account, in this traffic load, of the different lengths of the data blocks assigned to it. It follows that this solution inherently places an unequal load on the different outlets belonging to a particular outgoing destination.

To overcome this disadvantage, different known solutions consist in adding, for each outlet, a device for measuring the cumulative queuing time relative to this outlet or, in other words, the accumulated quantity of information waiting for this outlet, that is the total number of data elements representing the queued variable length data blocks. Then the traffic is spread equally over the outlets by a circuit for selecting the outlet out of a group of outlets, the cumulative queuing time measuring circuit of which indicates a value lower than those of the other outlets of this group.

In addition, it is often necessary for the choice of outlet from a group of outlets to introduce a decorrelation to the outgoing traffic (that is for the choice to be made without regard to the previous flow of traffic over the outlets). Taken in isolation, this requirement is simple to satisfy, by introducing the effect of a source of random signals in the choice of one of the outlets of the group. However, the use of this arrangement becomes more expensive or slower in the case of a point-to-multipoint cell transfer; in such a case, the identity of the cell must be written in a number of queues, one for each outlet selected to receive a copy of the cell addressed to one of the several selected destination outlet groups. In this case a random selection circuit is required for each group of outlets, to proceed in parallel and without additional delay, or else it is necessary to proceed serially in time for the different groups of selected outlets, which increases execution time.

The problem becomes much more complicated when the two preceding requirements (distributing the traffic equally over the different outlets in each group and random choice of outlets to decorrelate outgoing traffic) must be satisfied simultaneously. The basic algorithms described previously for these two requirements considered in isolation are contradictory. They cannot be logically combined in a simple way to satisfy these requirements at the actual moment of outgoing transfer of the data blocks to the selected outlets (reading of the queues), whereas the selection operation is performed when the identity of the data block is written in one (or more) outlet queues. The implementation of a solution combining the algorithms required to satisfy these two requirements, including the case of point-to-multipoint transfer, by selecting an outlet in each group of destination outlets, before writing the identity of the data block in the outlet queue involves very considerable complexity and is therefore very expensive.

DISCLOSURE OF INVENTION

This invention proposes a temporary information storage system comprising a buffer memory storing data structured as fixed or variable length data blocks, each comprising one or more data elements, a plurality of queues serving to interlink the data blocks in order to transfer them selectively to individual outlets that may belong to separate destinations and a management logic for these queues, as previously defined, which does not suffer from the disadvantages mentioned.

The temporary information storage system according to this invention is characterized in that it comprises a data block (or cell) and outlet selection queue management logic containing a queue specific to each outgoing destination, such that when a data block is assigned to an outgoing destination, it is sufficient to write its identity in the queue for this outgoing destination, said data block and outlet selection queue management logic comprising data block selection means acting when a queued data block must be assigned to an individual outlet, identifying a queue of an outgoing destination to which this outlet belongs, by obtaining the address of a data block and assigning the selected data block to the outlet in question by initiating the transfer of this data block to this individual outlet.

Thus, according to the invention, an equal distribution of the data block traffic over the outlets of each group of outlets will be achieved simply (without addition of traffic load supervision circuits for each outlet) through the fact that each queue associated with the group of outlets of an outgoing destination is read by the outlets which serve it as they become available in time (and therefore according to their respective instantaneous load).

According to another characteristic of the invention, it being possible for one outlet to belong to a number of outgoing destinations, said data block selection means comprise outgoing destination selection means to identify outgoing destinations to which a given outlet belongs, to identify those of said outgoing destinations having at least one data block to transfer and to select an outgoing destination from these last outgoing destinations, the identity of the selected outgoing destination then enabling said data block selection means to establish the identity of the queue of this selected outgoing destination.

According to another characteristic of the invention, said outgoing destination selection means are constructed to identify the outgoing destinations having at least one data block to transfer by considering said outgoing destinations in an order based on destination types and to select one outgoing destination out of these last outgoing destinations on the basis of said order.

According to another characteristic of the invention, said outgoing destination selection means, with the objective of identifying the outgoing destinations having at least one data block to transfer, comprise a counter for each outgoing destination, giving the number of data blocks to be transferred for said outgoing destination, and a detection circuit specifying whether said number is zero or different from zero.

According to another characteristic of the invention, said data block and outlet selection queue management logic comprises outlet selection means operating in two successive phases during time slots of a repetitive cycle, a first phase for receiving an individual outlet requesting an indication that a data block must be assigned to it and a second phase for supplying the identity of a selected outlet to which a data block must be assigned.

According to another characteristic of the invention said selected outlet identity supplied in a second phase is that of said requesting individual outlet of the immediately preceding first phase.

However, according to a preferred variant, said selected outlet identity is supplied by a selected outlet identity source, such that the selected outlet identity is defined independently of the identity of said requesting individual outlet.

According to another characteristic of the invention, said source is a counter with a number of active positions equal to the number of said time slots and which passes through all its positions at the rate of one per time slot in said cycle.

According to another characteristic of the invention, said source counter accomplishes one or more additional steps, forwards or backwards, at regular or irregular intervals.

According to another characteristic of the invention, said source counter accomplishes one or more additional steps, forwards or backwards, once in each of said cycles.

According to another characteristic of the invention, the accomplishment of said additional steps is disabled in one cycle out of N, where N is neither a multiple nor a submultiple of the number of time slots in a cycle.

According to another characteristic of the invention, the number of said additional steps is on each occasion supplied by a successive random or pseudo-random number source.

According to another characteristic of the invention, as a variant, said counter is set to a specified position at the start of each cycle.

According to another characteristic of the invention, said specified position is supplied from or taking account of a source of successive random or pseudo-random numbers.

According to another characteristic of the invention, said number source is said selected outlet identity source.

BRIEF DESCRIPTION OF DRAWINGS

The various objects and features of the invention will be described in more detail in the following, nonlimiting description of an embodiment of the invention taken in conjunction with the accompanying drawings wherein.

BEST MODE FOR CARRYING OUT THE INVENTION

The following description, which refers to the accompanying diagrams, relates to the case of applying the invention to the switching of data blocks or cells using a switching element included in a switching network embodying several stages of such switching elements This switching element is described in the above referenced U.S. application No. 07/565,310 of Aug. 9, 1989 and is included in a switching network of which several examples are described in European patent application No 90401393.5, (corresponding to commonly assigned U.S. application No. 07/776,337) both unpublished. The descriptions relating to FIGS. 1 through 5, which are necessary to an understanding of this invention, have been largely taken from these previous patent applications. To simplify this text, they have been simplified whenever possible.

In these figures, also for simplification, various connections are shown as single wires, although they can incorporate a plurality of such wires. In addition, the figures do not represent all the control circuits, their implementation being obvious to those skilled in the art from the content of the description.

Figure 1:
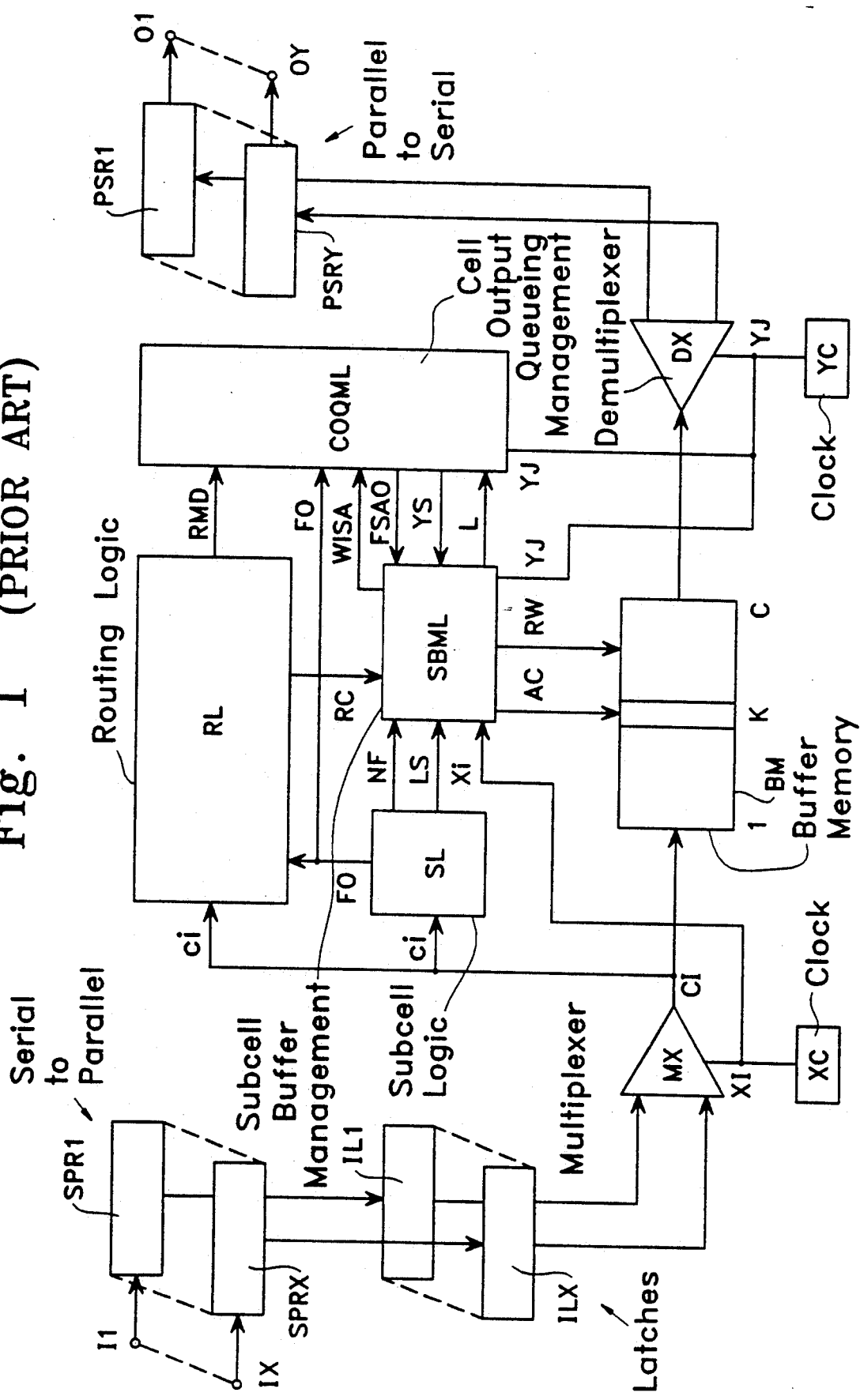
FIG. 1 is a known diagram of the circuits of an example of a switching element ISE to which this invention applies.

The switching element shown in FIG. 1 has X inlets I1/IX and Y outlets O1/OY (where X and Y are not simultaneously equal to 1). The Y outlets belong to different outgoing destinations. One or more outlets constituting a group of outlets belong to a particular outgoing destination. A particular outlet can belong to a number of outgoing destinations. This will be described in greater detail further on.

Figure 2:
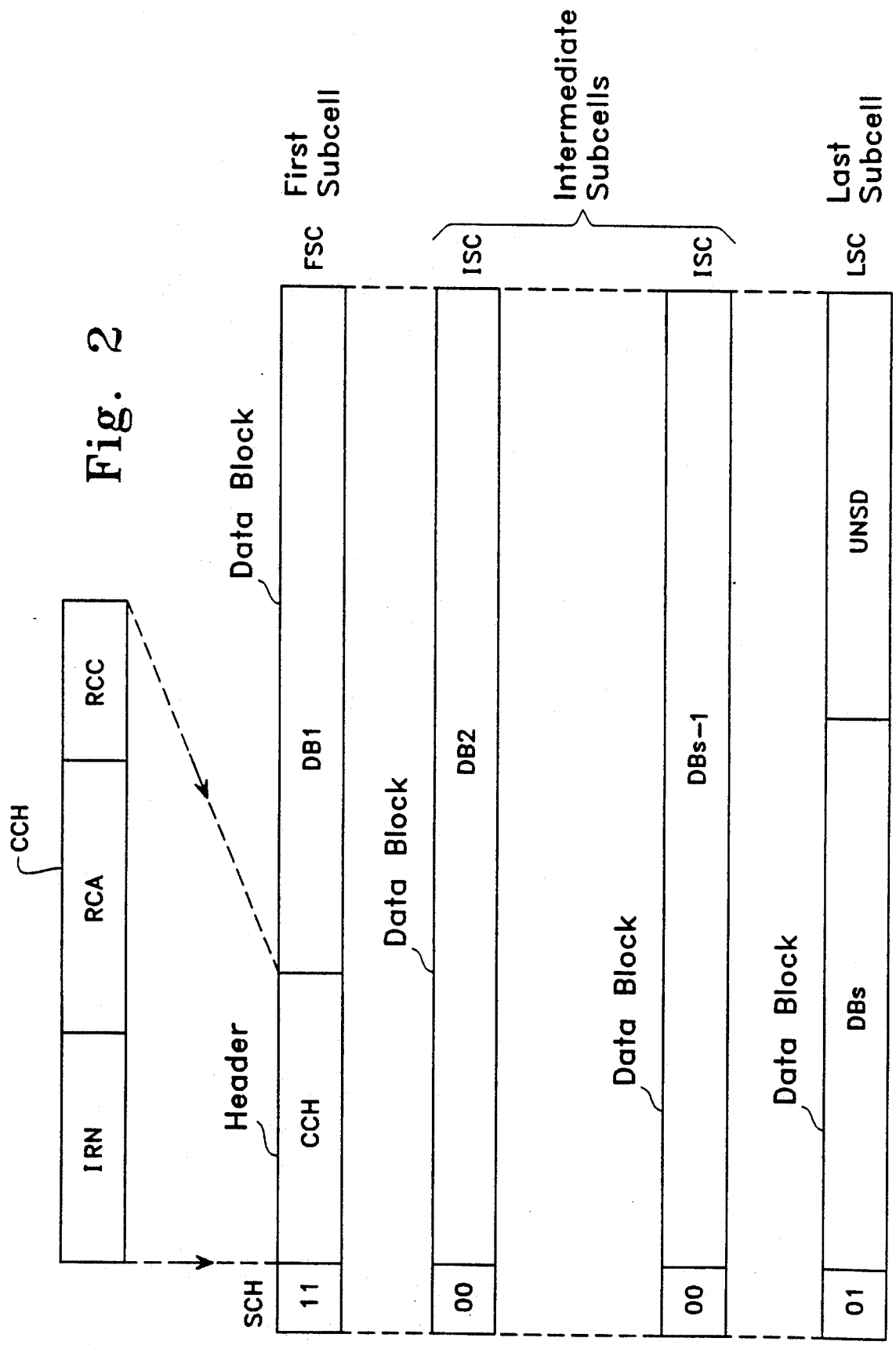
FIG. 2 represents the format of a data block called a cell, switched by the switching element in FIG. 1, in accordance with the invention.

This switching element is arranged to switch numeric data arranged in fixed or variable length data blocks. Such data blocks are often called packets or cells in the transmission and switching techniques implemented in data communication. In the following text, adopting the language of asynchronous time division multiplex communication, we shall use the word cell to denote such data blocks. An example of a cell conveyed by the switching element in FIG. 1 is shown in FIG. 2. This cell consists of an uninterrupted series of successive subcells, comprising a first subcell FSC, one or more intermediate subcells ISC and a final subcell LSC, all of equal length, for example 162 bits, or 2 bits and twenty 8-bit characters. Each of these subcells contains a subcell control header SCH (2 bits) and a data block DB1-DB8. The first subcell FSC contains in addition a cell control header tag CCH which, itself, contains routing information enabling the switching element to determine to which outgoing destination(s) or group(s) of outlets all the subcells belonging to the same cell must be transferred, successively and without interruption, this transfer being performed, in each group of outlets, via the same outlet. The subcell control header has an explicit binary value 11, 00 or 01 indicating that the subcell is respectively the first subcell FSC, an intermediate subcell ISC or the last subcell LSC of the cell.

The CCH tag itself has three parts, a routing control code RCC, a destination indication in the form of a network output address RCA and a multicast tree internal reference number IRN.

The routing control code RCC, which can comprise 5 bits, contains routing mode data which can denote a point-to-point routing mode or a point-to-multipoint routing mode or any other required routing mode, certain of which will be explained subsequently. If, for the switching element in question, the routing control code RCC denotes the point-to-point routing mode, analyzing the network output address RCA provides the identity of the destination outlet group. If the routing control code RCC denotes the multicast routing mode, the multicast tree reference number IRN is used to read a memory which provides the identities of the outlet groups corresponding to the branches to be taken for this tree in the switching element in question.

Figure 3:
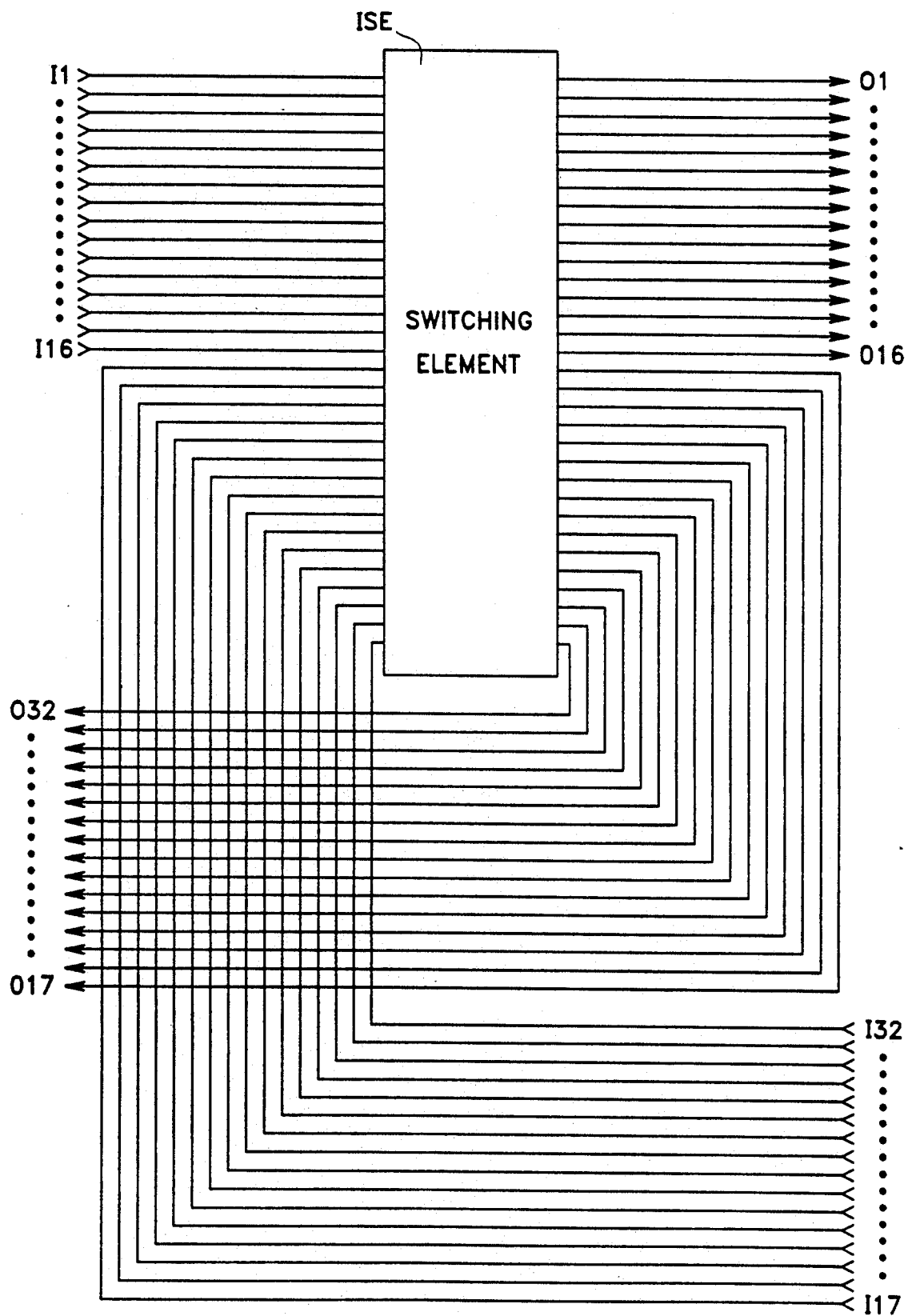
FIG. 3 is a diagram of a method of applying the switching element in FIG. 1, for routing cells in two opposite directions.

FIG. 3 now represents, for reasons of drafting convenience, a method of using the switching element ISE in FIG. 1 in the case of bi-directional routing, with a reflection facility.

The switching element ISE, in the example in FIG. 3, comprises 32 inlets I1 to I32 and 32 outlets O1 to O32. The inlets I1 to I32 are divided into two sets of inlets I1 to I16 and I17 to I32. The outlets are divided into two sets of outlets O1 to O16 and O17 to O32. Internally, other than in the reflection situation, the switching element is constructed to provide for normal left to right routing from inlets I1 to I16 to outlets O1 to O16, and, in parallel, but from right to left because of the external wiring method, from inlets I17 to I32 to outlets O17 to O32. In the reflection situation, the switching element provides for the routing of inlets I1 to I16 to outlets O17 to O32, or inlets I17 to I32 to outlets O1 to O16. In such a switching element, the assignment of the inlets to the routing directions is predetermined. It may be indicated by a bit IO attached to each inlet and which indicates whether it belongs to an "incoming" direction (I1 to I16, for example routing traffic normally intended for the set of outlets O1 to O16) or the opposite (outgoing) direction (I17 to I32, in the same example, routing traffic normally intended for the set of outlets O17 to O32).

The set of 16 outlets in each direction can be for example divided into a maximum of eight groups of at least two outlets assigned in this way to eight outgoing destinations and the routing of any cell to the outlets of one of the groups simply requires identification by an eight bit word (one bit per group) of the group or groups to which the cell is to be forwarded, it being understood that the cell is forwarded over a single outlet of each group thus identified. The same outlets can in addition all belong to the same outgoing destination, which will enable a cell to be routed to any of the outlets considered in a group. Conversely, the 16 outlets can also belong to as many outgoing destinations, to enable cells to be routed to individual outlets. It can be seen from these examples which are not exhaustive that the same outlet can belong to a number of outgoing destinations.

In addition, although not shown in FIG. 3, the switching element in FIG. 1 comprises an additional inlet and an additional outlet each connected to test control equipment not represented and not described, which can be implemented in a known manner and which is outside the scope of this invention.

Referring again to FIG. 1, inlets I1/IX of the switching element are connected to the respective data inputs of a multiplexer MX through the cascade connection of respective serial-parallel converters SPR1/SPRX and respective buffer registers IL1/ILX. The data output CI of the multiplexer MX is coupled to the data input, also CI, of a RAM type buffer subcell memory BM, while the selection input XI of the multiplexer MX is controlled by an input clock circuit XC capable of connecting successively each of the X inputs of the multiplexer to the multiplexer output CI, during a subcell period. Such a subcell period is the time slot during which a subcell is received in serial form in a serial-parallel converter circuit SPR1/SPRX.

The data output of the buffer memory BM is connected to the data input of a demultiplexer DX of which the Y data outputs are coupled to respective outlets 01/OY through respective parallel-serial converter circuits PSR1/PSRY. The selection input YJ of the multiplexer DX is controlled by an output clock circuit YC capable of successively connecting the input of the demultiplexer to the Y demultiplexer outputs during a subcell period.

The buffer memory BM is shared between all the inlets and all the outlets. It is divided into C, 512 for example, subcell buffer memory locations, each capable of storing one subcell; it has an address input AC, and a read/write selection input RW, coupled respectively to the outputs of the same names of a subcell buffer memory management logic SBML.

The switching element also comprises a subcell logic SL and a routing logic RL, which are both coupled to the data output CI on the multiplexer MX.

The subcell SL is mainly a supervision circuit designed to detect and verify the subcell control header of each subcell (see FIG. 2) and to provide active output signals LS, OF or NF, according to whether the subcell is respectively a last subcell SC, a first subcell FSC or not a first subcell.

The routing logic RL analyzes the routing information in the cell control header tag CCH of each first subcell FSC of a cell and provides active output routing signals RMD and RC, according to the routing information. More particularly, the RMD signals provide the identity of one or more selected outlet groups to the same outlet of each of which the subcells of the cell must be transferred, while signal RC indicates the number of the selected outlet groups, that is one for a point-to-point transfer and a value higher than one for a point-to-multipoint transfer.

The cell and outlet selection queue management logic simultaneously handles outlet cell queue management and the outlet selection function within an outlet group. It is in this queue management logic COQML that this present invention finds its application.

On receipt of a first subcell of a cell, which is stored in the buffer memory BM, the buffer memory management logic SBML provides the cell and outlet queue management logic COQML with a write command signal RW, accompanied by the address WISA of the memory location in which this first subcell is stored. The management logic COQML stores this address in one or more appropriate queues, as will be seen further on, according to the outlet routing signals RMD supplied by the logic RL, in order to transmit the cell to an outlet of a group of outlets or an outlet of each of several groups of outlets.

When transmitting the first subcell of a subcell to an outlet, it is the cell and outlet selection queue management logic COQML that identifies this cell by transmitting the address of the first outlet subcell FSAO to the logic SBML, at the same time as the identity of the selected outlet YJS.

The subcell buffer memory management logic is coupled to the previously mentioned outlets LS, NF of the logic SL, RC of the logic RL, XI of the input clock circuit XC, FSAO and YJS of the cell and outlet selection queue management logic COQML, and YJ of the output clock circuit YC. It manages the use of the buffer memory locations of the memory BM, by providing the address of free locations, rendering them busy when they are in use and releasing them when they are no longer in use. Under the control of signals applied to its inputs, it also controls the cycles of read and write operations in the buffer memory BM and the operation of the management logic COQML, via the read/write selection signal RW, at the same time constituting linked lists linking the buffer memory addresses of the subcells of a particular cell. This is necessary, because the subcells of a particular cell are stored in uncorrelated locations of the buffer memory BM, whereas they must be routed to the same selected outlet(s) 01/OY, in the order in which they arrived at one of the inlets I1/IX, and without interruption.

There follows a brief description of the operation of the switching element in FIG. 1.

When a subcell of a fixed or variable length cell, as represented in FIG. 2, appears at one of the inlets I1-/IX, I1 for example, of the switching element, it is received by the corresponding serial-parallel converter circuit SPR1. Supplied by this converter circuit SPR1, the parallel version of the subcell is transferred to the corresponding buffer register IL1, through which it is supplied to the multiplexer MX. Under the control of the clock signal XI supplied at the input of the same name by the input clock circuit XC, the subcell is, at a certain moment, corresponding to this inlet I1, supplied to the data input CI of the buffer memory BM, and to the subcell logic SL and routing logic RL. The output signals LS, NF and RC of these two logic circuits are applied to the subcell buffer memory management logic SBML and the outlet routing signals RMD to the cell and outlet selection queue management logic COQML.

Under the control of the clock signal XI, the logic SBML supplies the address WISA of a free buffer memory location to the address input AC of the buffer memory BM, as a result of which the subcell present at the data input CI of the buffer memory BM is stored in the location of said buffer memory, K for example, having the address WISA. This address WISA is rendered busy and is added to the linked list of addresses of all the subcells of the same cell already received. In this list, the addresses are arranged in the same order as that of the subcells of the cell.

When a subcell is read from the memory BM, for transmission to one of the outlets 01 to OY of the switching element, under the control of the clock signal YJ supplied at the inlet of the same name, by the output clock circuit YC, the buffer memory management logic SBML supplies the address of this subcell at the address input AC of the buffer memory BM and the subcell in the corresponding memory location is read and transferred to the data output of the buffer memory BM. From there, it is transferred, through the demultiplexer DX to the outlet indicated by the signal YJ. The cell and outlet selection queue management logic COQML is informed of the receipt of the cells stored in the buffer memory BM and of their destination(s); it is also this logic which, informed of the transmission of a last subcell of a cell to an outlet, identifies another cell stored in the buffer memory BM, which must then be transmitted to the outlet in question.

Of the different logic circuits comprising the switching element in FIG. 1, the subcell logic SL is merely a simple decoding circuit. Its implementation is therefore within the scope of those skilled in the art and it is unnecessary to give a detailed description of it here.

Figure 4:
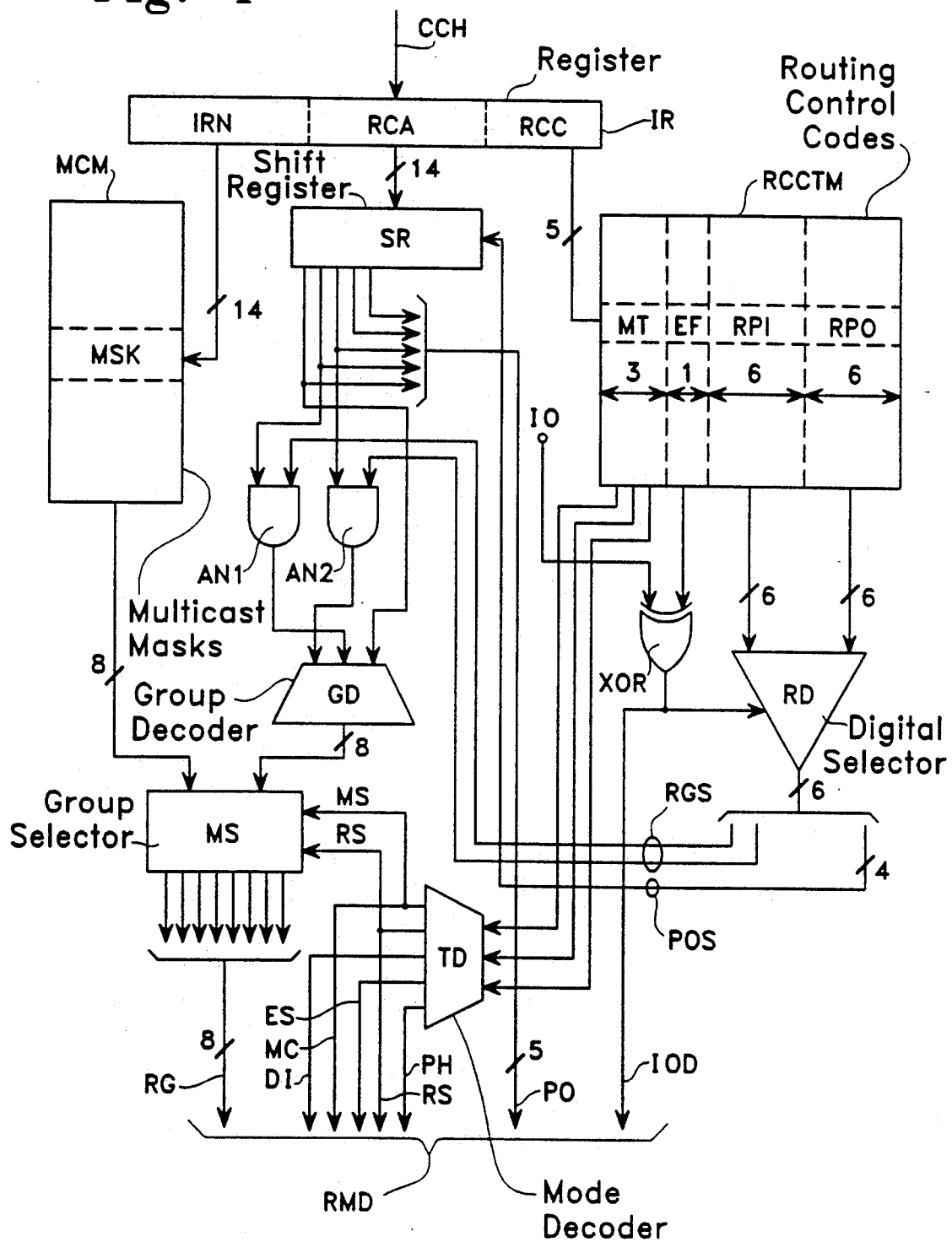
FIG. 4 is a diagram of the routing circuit RL in FIG. 1, enabling the switching element in FIG. 1 to be used in accordance with the diagram in FIG. 3.

There now follows a description, with reference to FIG. 4, of a method of implementing the routing circuit RL in FIG. 1, allowing bidirectional operation as shown in FIG. 3.

The circuits in FIG. 4 receive, in a register IR, the cell control header tag CCH mentioned in FIG. 1, in order to output the information marking the control link RMD which supplies to the cell and outlet selection queue management logic COQML the information specified in the selected routing method (ES, MC, DI, RS, PH), and the routing data (RG, PO).

The link RMD routing method information is as follows:

a "group" mode signal RS which is present when the cell is to be forwarded to one of the outlets of a group of outlets, in the event of point-to-point routing, a "multicast" mode signal MC, which is present when the cell is to be routed to one of the outlets of each of several groups of outlets, in the event of point-to-multipoint routing, a "distribution" mode signal DI, which is present when the cell is to be forwarded to one of the outlets of a set of outlets, in the direction explained with reference to FIG. 3, in the case of a bidirectional switching element, or to one of all the outlets of the switching element, in the case of a unidirectional switching element, thereby implementing general distribution, a "service" mode signal ES, which indicates that the cell received is addressed to a particular control outlet, a "directed transfer" mode signal PH, which indicates that the cell is to be forwarded to a predetermined outlet, for test reasons, for example.

The RMD link routing data comprises:

group identity signals RG which identify the group(s) to an outlet of which the received cell is to be forwarded, for routing modes RS and MC, an outgoing direction signal IOD which identifies one of the two sets of outlets in the case of a bidirectional switching element, individual outlet identity signals PO used with routing mode PH.

According to the inlet at which a received cell arrives, the circuits in FIG. 4 also receive an incoming direction indicator IO which is for example supplied by the receiving circuit supplying the cell in question, via the input multiplexer in FIG. 1, specifying the incoming direction concerned, in the direction mentioned referring to FIG. 3.

The circuits in FIG. 4 comprise the following elements:

the register IR already mentioned, for receiving the CCH tag of each cell received, which includes, as indicated, the information RCC, RCA and IRN, a control translation memory RCCTM, storing 32 16-bit words, called routing parameters, each comprising a three-bit routing mode code MT, a reflection flag or bit EF, a six-bit "incoming" routing group field RPI and a six-bit "outgoing" routing group flag RPO, a multicast memory MCM, storing a plurality of eight-bit mask words MSK, with one bit for each outlet group, each identifying the different routing groups to which a copy must be sent, a routing mode decoder TD, decoding the routing mode code MT and consequently supplying the five routing mode signals mentioned previously, a direction selector RD selecting either the "incoming" routing group field RPI or the "outgoing" routing group field RPO of the control translation memory RCCTM, according to the reflection bit EF and the incoming direction indicator IO, an outlet group selector MS having two parallel eight-bit inputs which supplies the group identity signals RG, also of eight bits, each bit of which corresponds to a separate group of the eight possible routing groups, a 14-bit shift register SR having a five conductor output PO; if the routing mode is the "physical" mode PH, this output identifies the output to which the received cell is to be routed, a routing group decoder GD, an exclusive-OR gate XOR, and two AND gates, AN1 and AN2.

The routing logic circuits in FIG. 4 operate as described below, when the header of a received cell is present on the input multiplexer (FIG. 1), the CCH tag of which is supplied to register IR, while the IO bit indicates the incoming routing direction. As indicated above, a clock controls the operation of the circuits, in an appropriate manner, in accordance with the current state of the art.

The routing control code, characteristic of a transfer sequence through an entire switching network, does not directly indicate the routing mode to be applied in the switching element in question. This routing mode depends on the type of switching network and the position of the switching element in it.

The control information must be interpreted and, for this, it is used as an address for reading from the control translation memory RCCTM routing parameters which have been previously written there by conventional control means, such as the test and control equipment mentioned previously; these routing parameters comprise the elements MT, EF, RPI and RPO defined above.

The routing mode code to be applied MT is decoded by the routing mode decoder TD which, as a result, supplies one of the mode signals RS, MC, ES, DI or PH.

The incoming direction indicator IO is applied to one of the inputs of the exclusive OR gate XOR, while the reflection bit EF is applied to its other input. The output of the gate XOR supplies the control signal IOD of the outgoing direction selector RD. The outgoing direction selector RD selects either the "incoming" routing group field RPI or the "outgoing" routing group field RPO, specifying for both sets of outlets, a specific part of the destination address RCA intended to supply the identity of a routing group to an outlet of which the received cell is to be forwarded. Each of these fields comprises a four bit position indicator POS and a two bit size indicator RGS. The position indicator POS controls the shift register SR so that the information RCA is shifted in it and a three bit part that it contains moves to the three lefthand stages, in the figure, of this register SR, or a five bit part that it contains moves to the five lefthand stages, in the figure, of the register SR. The size indicator RGS indicates how many of the three bits mentioned first must be used to define the identity of a routing group. Thus, the lefthand bit of these three bits is transmitted directly from the shift register SR to the group number decoder GD, the next bit is transmitted by the AND gate AN1 according to one of the RGS signals and the third bit by the AND gate AN2 according to the other RGS signal. The group number decoder DG supplies an eight bit word which constitutes the identity of a routing group, applied to the selector MS. In this word, only one bit has the value 1, for example, all the others having the value 0.

Simultaneously, the 14-bit multicast tree internal reference number IRN is applied by the register IR to the multicast memory MCM, where it serves as an address for reading an eight bit mask word MSK. As indicated above, this mask word identifies one or more routing groups in an eight bit word, in which one or more of the bits have the value 1, the others having the value 0. It is also applied to the selector MS.

If the routing mode signal supplied by the decoder TD is the "group" mode signal RS, the selector MS supplies at its output a group identity signal RG which is the signal supplied by the decoder GD; if it is the "multicast" mode signal MC, the RG signal transmitted by the selector MS is the signal MSK.

In addition, the five lefthand stages of the shift register SR, after the shift caused by the position indicator POS, directly supply the identity PO of an outlet to which the received cell is to be forwarded, in the case of the "physical" routing mode PH.

In the particular case of the "distribution" mode DI, no group of outlets need be identified, since there is only one group comprising all the outlets of the set considered in the transfer direction concerned.

In the case of the "service" mode ES, the outlet concerned is known directly, since the cell received is addressed to an additional control outlet mentioned above. It can therefore be seen that the information contained in the control translation memory RCCTM defines, in the switching element, the interpretation that this switching element must make of the 32 possible transfer sequences denoted by the control information RCC to determine the routing mode to be applied in accordance with the routing data contained in the tag of the cell received. This involves combining the routing information of a cell, unchanged while the cell passes through the switching elements of the different stages of a switching network, with the routing parameters of the switching element in question, derived from its position in the network, for example specific to each stage and leading to a particular routing mode in each stage and for each routing sequence.

The information in the control translation memory RCCMT is semipermanent and can be written as each switching element enters service. However, the information in the multicast memory MCM must be modified during operation, to establish each multicast tree.

Figure 5:
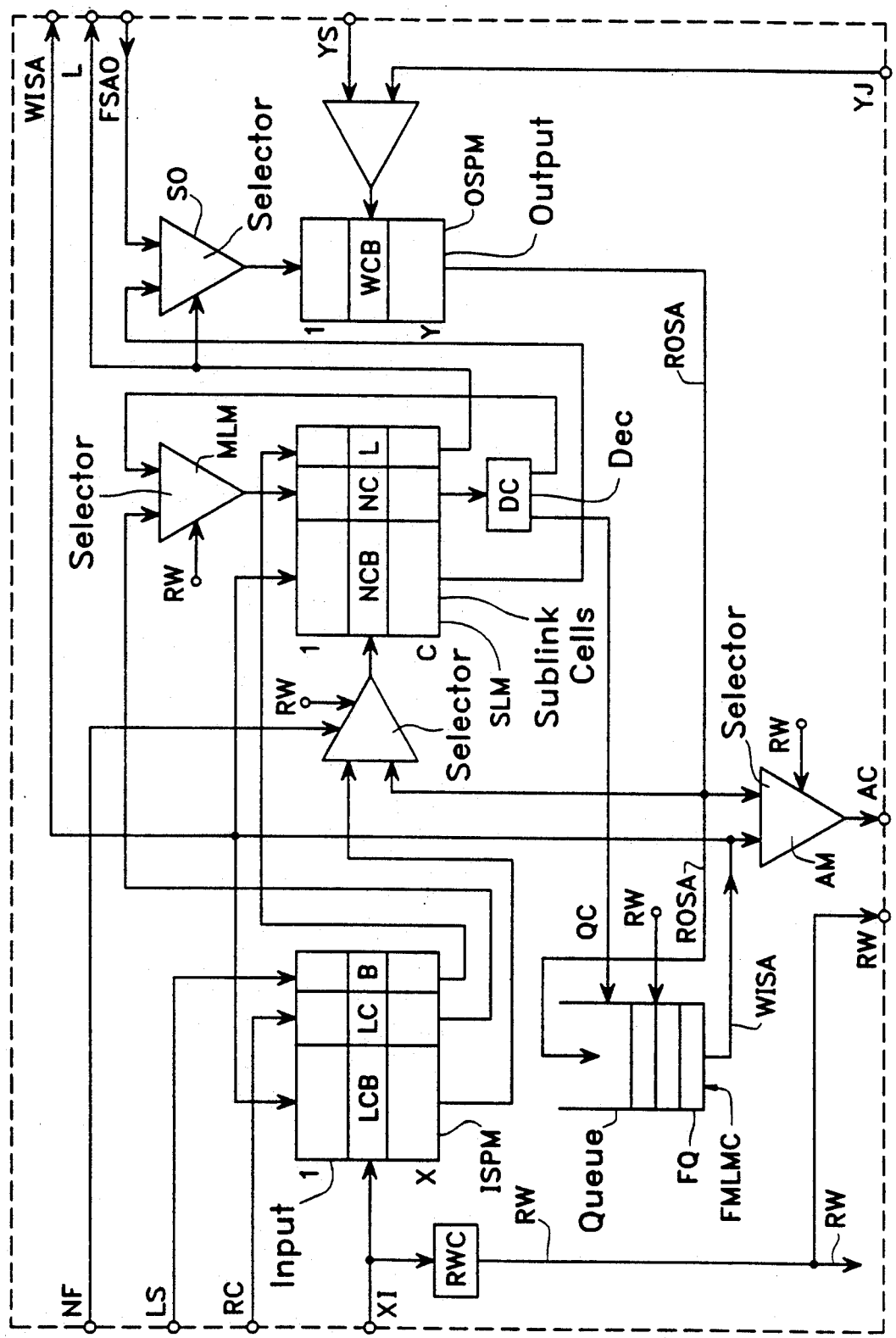
FIG. 5 is a detailed diagram of the subcell memory management logic SBML in FIG. 1.

There now follows a description, in conjunction with FIG. 5, of a method of implementing the subcell buffer memory management logic SBML in FIG. 1.

As already mentioned, this subcell buffer memory management logic has inputs LS, NF, RC, XI, YJ, FSAO and YJS, and outputs AC, L, RW and WISA. It comprises a free memory location management circuit FMLMC, a subcell link memory SLM, an incoming subcell pointer memory ISPM and an outgoing subcell pointer memory OSPM.

The FMLMC circuit of the SBML logic consists of a free location queue memory FQ which is, for example, a FIFO memory (first in-first out) storing the addresses of all the free locations in the buffer memory BM. The FMLMC circuit has an input ROSA, an output WISA and control terminals QC and RW.

The subcell link memory SLM comprises C memory locations corresponding to the C buffer memory locations of the subcell buffer memory BM and stores, for each of them:
the link address to the next subcell (NCB),
the number of subcell copies which must be read (NC),
a flag indicating the last subcell of the cell (L).

The SLM memory field is associated with a down-counter DC, so that the value NC is decremented by unity on each SLM memory read operation; then, the new value is stored instead of the previous value. Of course, when the new value reaches 0, all subcell copies have been read and the counter DC generates a signal QC for storing the read subcell address (ROSA), which becomes free, in the free memory location management circuit FMLMC.

The incoming subcell pointer memory ISPM has X locations corresponding to the X inlets and operates in synchronism with the input clock signals XI defining the time division multiplex operation of the X inlets. For each inlet, it stores:
the buffer memory address of the last subcell received (LCB),
the number of subcell copies which will have to be read later (LC),
a flag indicating the last subcell of the cell (B).

The outgoing subcell pointer memory OSPM has Y locations corresponding to the Y outlets and operates in synchronism with the output clock signals YJ defining the time division multiplex operation of the Y outlets. For each outlet, it stores the address of the location of the next subcell waiting to be transmitted to the outlet in question (WCB).

A read/write control circuit RWC supplies the various circuits with the appropriate control signals determining the alternate operation of the circuits of the buffer memory management logic SBML, associated with the alternate read and write operations in the buffer memory BM, resulting from the interleaved clock signals relating to the inlets (XI) and the outlets (YJ). In line with this, the signal RW generated by the control circuit RWC is active during each buffer memory BM write operation, for the input of a subcell and inactive during a buffer memory BM read operation for the output of a subcell.

The following outline description encompasses the operation performed by the buffer memory management logic SBML during alternating write and read phases and for each of the three types of subcell of a cell: first subcell FSC, intermediate subcell ISC and last subcell LSC.

We shall first consider the buffer memory BM write phase, in the case of a first subcell FSC received at an inlet XI. In such a case, the signal OF is supplied and the management logic SBML receives from the logic circuits SL and IL:
NF=0, to indicate a first subcell,
LS=0, to indicate that it is not a last subcell,
RC=2, assuming for example the case of a point-to-multipoint transfer to two groups of outlets.

The signal RW being active, a write subcell address WISA is supplied by the FMLMC management circuit, denoting the free buffer memory location in which the received subcell is stored. For this, the address WISA is transmitted over the link AC to the memory BM (see FIG. 1), by an address multiplexer AM directed by the signal RW. The address WISA is also stored in the pointer memory ISPM, for inlet XI, in order to store it as a last received subcell address, in view of the next cycle relating to the same inlet. In addition, the address WISA is also supplied to the logic COQML which will store it as the reference identity of a new received cell, because this logic receives the signal OF with the value 1. It is clear that the reference identity of the received cell could be, not the address of the first subcell of the cell in the buffer memory, the number of bits of which depend on the number of memory locations of the buffer memory BM, but a shorter reference identity supplied for each new cell received, by a reference identity management circuit similar to the free buffer memory location management circuit FMLMC.

With respect to the link memory SLM, because it is a first subcell FSC (NF 0), the address WISA is not stored in the field NCB, since there is no need for this new subcell to be linked with the last subcell of the previous subcell. But, the other data fields must be and are normally used with respect to this previous subcell, which leads to the selection of its address which is supplied by the LCB field of the pointer memory ISPM and the storage of values LC and B from the pointer memory ISPM in the NC and L fields of the SLM memory respectively, the multiplexer MLM being directed consequently by the signal RW. Also, the control signals RC and LS are stored respectively in fields LC and B of the ISPM memory for inlet XI.

In the case of an intermediate subcell ISC, the signal OF is inactive and the subcell buffer memory management logic SBMI, receives from the logic circuits SL and RL the signals:

NF=1,
LS=0,
the signal RC is not used with NF=1.

As before, the signal RW is active and another address WISA is supplied by the FMLMC management circuit, a buffer memory location address which is used:

to address the buffer memory BM and write in it the intermediate subcell ISC, to be stored in the LCB field of the pointer memory ISPM as the new last received subcell address of the cell, to be stored in the NCB field of the SLM memory, which is addressed by the content of the LCB field of the memory ISPM, in order to write in it this new address WISA as the address of the next subcell linked to the previous subcell to which is assigned the memory location selected by the content of the LCB field in the SLM memory. Simultaneously, the data of fields LC and B of the memory ISPM are transferred into fields NC and L of the memory SLM, before B is replaced in the memory ISPM by a new value coming from signal LS (the content of the LC field remaining unchanged, since the number of subcell copies to be read for all the other subcells is the same as that which was established for the first subcell of the cell).

In the case of a last subcell LSC, the signal OF is inactive and the management logic SBML receives from the logic circuits SL and RL:

NF=1,
LS=1,
while RC is not used since NF=1.

Again the signal RW is active and another address WISA is supplied by the circuit FMLMC and the corresponding buffer memory location address is used in the buffer memory BM and the memories ISPM and SLM exactly as in the previous case of storing an intermediate subcell ISC.

Simultaneously, the values LC and B of the memory ISPM are transferred to fields NC and L of the memory SLM before B is replaced in the memory ISPM by the new value from the signal LS, thereby indicating that the last subcell of the cell has just been received.

It will be remembered, as was emphasized in the description concerning the storing of a first subcell FSC, that during the following cycle concerning inlet XI, values LC and B=1 will be transferred into fields NC and L of the memory SLM at the address of the subcell in question (the last) supplied by the LCB field of the memory ISPM.

There follows a description of a buffer memory BM read phase for transmission of a subcell to one of outlets 01 to OY, during which the signal RW is inactive. Initially, we shall consider particularly the case of reading a first subcell FSC, for an outlet denoted YJ.

It must be assumed that, at the time of sending the first subcell, the content WCB of the outgoing subcell pointer memory OSPM of the outlet in question YJ has been initialized and contains the address of the first subcell of the cell to be transmitted. This will appear further on, when the last subcell of the cell is read.

A pointer memory ISPM addressed by the identity of outlet YJ then supplies the address denoted ROSA of the read outgoing subcell, which is used for:

addressing the buffer memory BM to read the corresponding first subcell FSC, the multiplexer AM being directed to the signal ROSA by the inactive signal RW and consequently supplying this signal ROSA on the link AC, selecting the memory SLM in read mode, which supplies:

an indication NCB which is transferred to the memory OSPM for storage as a new address WBC, for the next cycle concerning the outlet YJ, the multiplexer SO being consequently directed under the effect of signal L, so long as it does not concern a last subcell, an indication NC which is decremented by unity and read/stored at a new indication NC, if it is not 0; if the value 0 is obtained, which means that the required number of read operations of this subcell (supplying the required number of copies of it) has been performed, the circuit DC generates a signal QC enabling the circuit FMLMC to register that the buffer memory location with the address ROSA can be released and included in the set of free buffer memory locations;

the value L which is equal to 0 since it does not concern the last subcell of the cell and which controls the previously mentioned transfer of the value NCB from the memory SLM to the WCB field of the memory OSPM via the multiplexer SO.

In the case of an intermediate subcell ISC, the same operations take place in memories OSPM and SLM and in circuit FMLMC as for reading a first subcell FSC.

In the case of a last subcell LSC, the memory OSPM again supplies the address ROSA of the subcell to be sent, which is used for:

addressing the buffer memory BM to read the last subcell, selecting the memory SLM in read mode, which supplies:

a value NC which is decremented and treated exactly as in the other cases of reading subcells, a value L, now equal to 1, indicating the presence of a last subcell LSC, which, in this particular case, prevents the transfer of the value NCB from the memory SLM to the WCB location of the memory OSPM, since there is no following subcell for the cell in question; instead, L=1 is supplied to the logic COQML to indicate that the outlet considered YJ is becoming available for sending a following cell, in the next cycle, since a last subcell of a cell is currently being transmitted.

Then, after selection by the logic COQML of the appropriate cell which must be transmitted to the outlet in question YJ, the logic COQML initializes the value WBC in the memory OSPM in respect of the outlet YJ, by writing in it the buffer memory location address FSAO of the first subcell of the new cell selected, before the next cycle concerning the outlet YJ. Because this initialization process is not necessarily implemented during the clock period YJ of the last subcell LSC, an asynchronous access to memory OSPM is used, using the outlet address YJS supplied by the logic COQML.

While this embodiment of the subcell buffer memory management logic SBML has been described to illustrate the principles of the subcell buffer memory management procedures used to transfer the cells composed of subcells between any inlet and any outlet (or outlets) of the switching element, other embodiments of the functions of this management logic SBML, for example with respect to the free buffer memory location management circuit FMLMC, are also included in the types of switching elements to which this invention applies.

We shall now return to FIG. 1, to consider particularly the cell and outlet selection queue management logic COQML. From the preceding descriptions, it is apparent that this management logic COQML has the following functions:

a) on receipt of any first subcell of a cell, indicated by the signal OF being active, receiving a reference identity which is, in the example described, the address WISA storing this first subcell, accompanied by routing signals RMD which denote at least one group of outlets, to one outlet of each of which the signal is to be transmitted, b) when transmission of a cell to any outlet YJ is coming to an end, supplying what is signalled to it by the signal L, the reference identity FSAO of a new cell to be transmitted to this outlet, which is, as stated in a) above, the address at which the first subcell of this cell is stored in the buffer memory BM; in addition, the management logic COQML which noted the identity of the outlet in question, denoted YJ, returns this same identity, denoted YJS, so that its response can be deferred with respect to synchronous processing of the outlet YJ.

In other words, the storing in buffer memory of each of the data blocks that are the cells conveyed by the switching element in FIG. 1, is indicated, with their outgoing destination(s) to the cell and outlet selection queue management logic COQML which takes note of them, and from this information, responds to the requests of individual outlets serving the outgoing directions, by supplying each of them with the identity of a data block which can be transmitted to this individual outlet.

As explained in the preamble to this application, this enables data blocks assigned to one or more given outgoing destinations to be made available, on each occasion, to one of the multiple outlets belonging to each of these given outgoing destinations.

According to known solutions, the cell and outlet selection queue management logic COQML could be limited to attributing each data block right away to one of the outlets of each outgoing destination to which it is assigned, a queue then being provided for each outlet.

The invention recommends another more powerful solution, one embodiment of which will now be described with reference to FIGS. 6 to 9.

Figure 6:
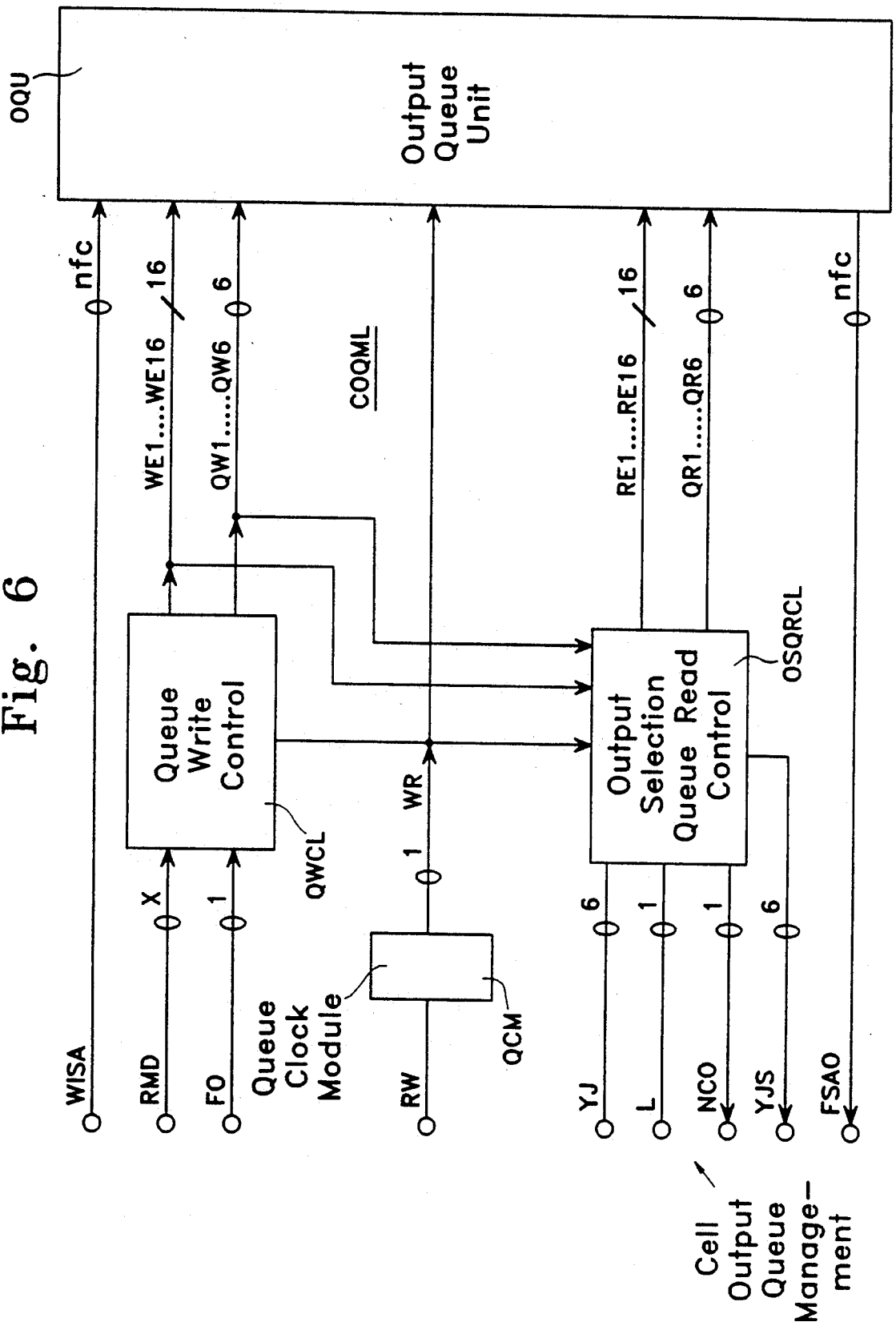
FIG. 6 is a general diagram of a method of implementing the cell and outlet selection queue management logic in FIG. 1.

FIG. 6 represents the cell and outlet selection queue management logic COQML in its most general form. It can be seen that this management logic comprises a queue write control logic QWCL, an outlet selection and queue read control logic OSQRCL and an outlet queue unit OQU. The overall operation of the cell and outlet selection queue management logic COQML is controlled by a clock module CM controlled by the signal RS (FIG. 1). The module QCM, in response to the signal RW, supplies to the cell and outlet selection queue management logic COQML various clock signals including the signal WR, which control the alternate execution of queue write and read phases, according to the descriptions which follow, applying techniques well known to those skilled in the art.

The write control logic QWCL operates in response to the active signal WR and on instruction of the control signal OF, which, it will be recalled, characterizes reception of a first subcell of a cell, which entails the necessity of storing a reference identity of this cell in a queue constructed to enable it to be forwarded to one or more outlets of the switching element in FIG. 1. This reference identity is the address WISA at which this first subcell is stored in the buffer memory of the switching element. It is accompanied by routing signals RMD. In fact, the role of the write control logic QWCL is simply to transmit these routing signals RMD which are supplied by the routing circuit RL to a group of x conductors and define the destination(s) of the cell, in terms of groups of outlets, the cell having to be transmitted to an outlet of each group of outlets thus denoted. According to the selected routing mode, the identity of the cell must be placed in one or more outlet queues, one for each destination, the case of several outlet queues corresponding to the "multicast" mode MC in which the cell must be routed to one of the outlets of several groups of outlets (8 or 16 at the maximum, in the example in question, according to whether the switching element is bidirectional or unidirectional, as explained previously). To be able to queue a cell simultaneously in as many queues, this translation supplies one or more signals on 16 conductors WE1--WE16 which control the writing in parallel in the outlet memory units concerned RGM1-RGM16 of the queue unit OQU as explained further on. In the embodiment in question, the queues consist of linked lists in outlet memory, each line of which, addressed by a cell identity, contains the identity of the next cell in the queue; a particular outlet memory can therefore contain a number of linked lists (several queues), so long as these are exclusive, that is so long as each cell identity belongs to only one queue of this outlet memory. Thus, as explained further on, the other 35 following queues are also in the first outlet memory unit RGM1, in the example in question:

32 "directed transfer" queues to an individual outlet,

1 "service" queue to the 33rd outlet for test and control purposes,

2 "distribution" queues, one for all outlets for each outgoing direction (only one of them being used in the case of a unidirectional switching element).

To denote the particular queue in the outlet memory unit RGM1, its identity is encoded on six additional conductors QW1–QW6.

In general, it can be seen that, according to the invention, each of these queues corresponds to an outgoing destination.

To sum up, therefore, the write logic QWCL takes care of the addition of cells to the outlet queues of the queue unit OQU. It performs a simple translation and can take the conventional form of a memory code converter; it will not be described in detail.

The outlet selection and queue read control logic operating when the signal WR is inactive, receives the identity of an outlet YJ, encoded on six conductors, which signals (signal L) that it is going to transmit the last subcell of a cell and asks that it be assigned to a following cell. This outlet belongs to one or more groups of outlets and the outlets of each group collectively serve an outgoing destination.

In a first embodiment, the logic OSQRCL reacts immediately and synchronously executes the queue selection for the outlet YJ. For this purpose, it identifies the outgoing destinations of which the outlet in question forms part, searches through the outgoing destinations of this outlet for those in which the queues are not empty, selects one of them and supplies its identity by marking conductors RE1–RE16 and QR1–QR6 which are the counterparts, in read mode, of conductors WE1–WE16 and QW1–QW6, in write mode. Taking account of the signal WR being inactive, the outlet queue unit OQU reads the selected queue and supplies the required cell identity FSAO which is as previously for the reference identity WISA, for example the address at which the first subcell of the cell is stored in the switching element buffer memory. These two addresses are presented on a number NFC of conductors corresponding to the number of bits of the storage address in question. In addition, the logic OSQRCL also supplies a signal NCO indicating the presence of a cell reference identity FSAO to be transmitted, and the identity YJS of the outlet in question. As indicated, the outlet identities (32 communication outlets plus a service outlet in the example in question) are encoded on six conductors. The supply of the outlet identity YJS is not essential in the first example, because it is the same as the identity YJ. It is mentioned merely for the sake of completeness.

It will be noted that the description of the functions of the two logic circuits QWCL and OSQRCL included a definition in general terms of the functions of the queue unit OQU. A more detailed description of it will be given a little further on with reference to FIG. 7.

In a second general embodiment, queue selection for the outlet YJ is deferred, and therefore asynchronous with respect to the outlet clock time slot assigned to the outlet YJ. The logic OSQRCL, after receiving the request for the cell to be transmitted from an outlet YJ does not react immediately to it. The request is merely stored. Later, after other similar requests may have been received from other outlets, the logic OSQRCL makes a selection from the requests stored, under conditions which will be explained further on in the description relating to FIG. 10. This selection denotes an outlet whose request is then satisfied. For this purpose, as in the first embodiment considered, the logic OSQRCL identifies the outgoing destinations of which the outlet in question forms part, searches through the outgoing destinations of this outlet for those with queues that are not empty, selects one of them and transmits its identity to the queue unit OQU, which reads the selected queue and supplies the required cell identity. In addition, the logic OSQRCL also supplies a signal NCO indicating the presence of a cell reference identity FSAO to be transmitted, and the identity YJS of the outlet in question, encoded on six conductors. The supply of the outlet identity YJS is then necessary to indicate to the logic SBML to which outlet the selected cell must be transmitted, since the synchronous time slot assigned for transmitting to this outlet has now elapsed.

The advantage of this second more general embodiment consisting in not serving the outlet queues as each outlet becomes available, is that it is possible to avoid queues being served by outlets in an order directly correlated with the cell traffic previously handled. To do so, a decorrelation is introduced for example in the handling of traffic in each group of outlets by making a random or pseudo-random choice of the order in which the different outlets having requested a cell will serve the outlet queues, and during a time slot corresponding to the time division multiplex cycle for processing all the outlets of the switching element.

Figure 7:
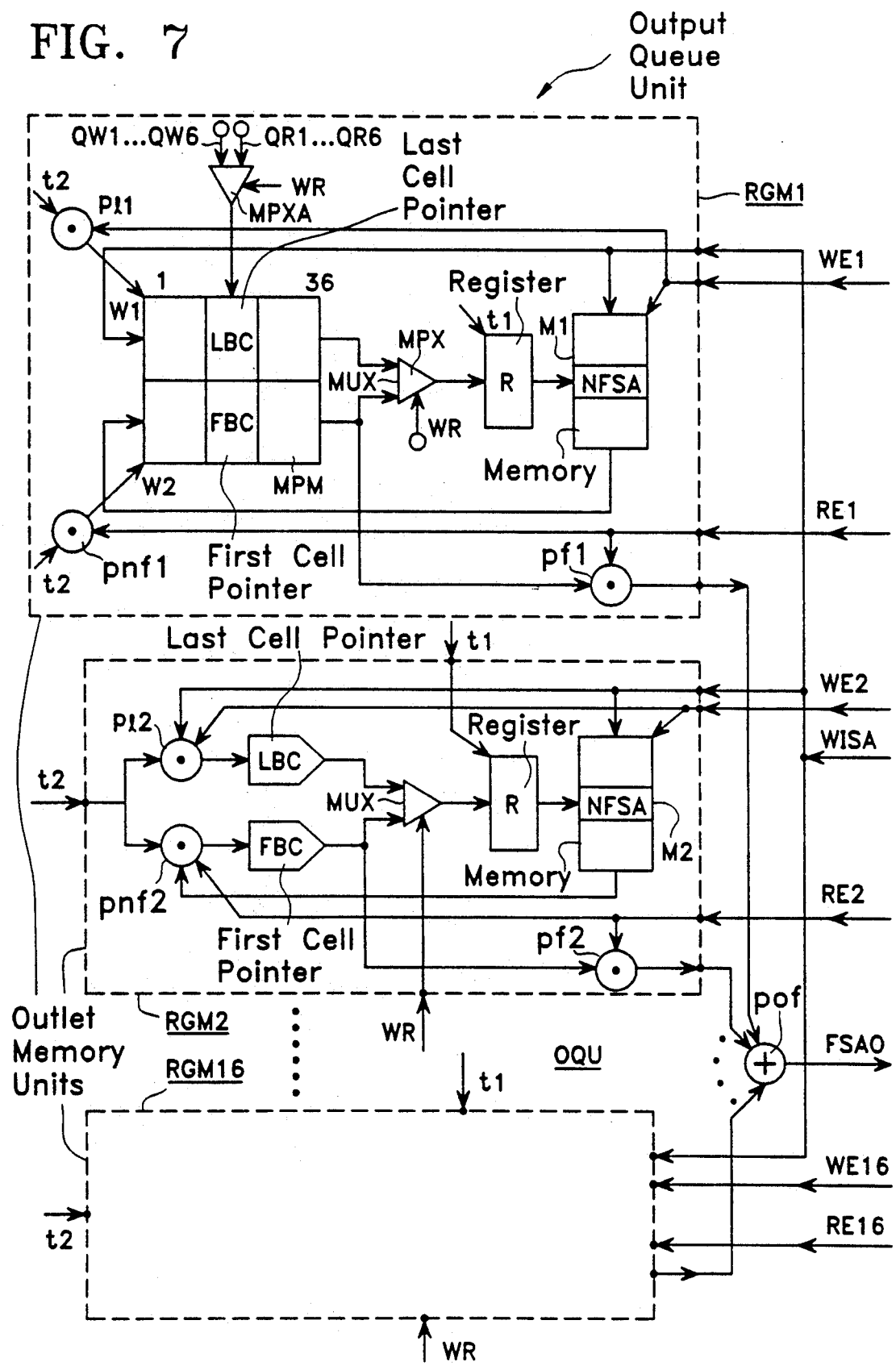
FIG. 7 is a detailed diagram of the circuits of a typical embodiment of the queue unit OQU of the cell and outlet selection queue management logic COQML in FIG. 6.

Before giving a detailed description of the outlet selection and queue read control logic OSQRCL, we shall refer first to FIG. 7 representing an embodiment of the queue unit OQU.

This queue unit essentially comprises outlet memory units RGM1–RGM16. The outlet memory units RGM2–RGM16 are identical and only the unit RGM2 is illustrated in detail; each contains an outlet queue in an outlet memory, M2 for the outlet memory unit RGM2. The outlet memory unit RGM1 is different. It contains 36 outlet queues in one outlet memory M1.

These figures relate to the example of a switching element in FIG. 3 and the description relating thereto. In this example, the switching element has 32 outlets, in two sets of 16 outlets and these outlets can be grouped in 16 (2×8) groups of outlets with one or more outlets each corresponding to an outgoing destination. In the context of point-to-multipoint communications, as an incoming cell can be copied to a number of outgoing destinations, and as in addition a cell is denoted by a single reference identity and as finally it is desirable for operating time reasons to proceed to queue any different cell copies in parallel, it follows that it is necessary to provide for an independent outlet memory for each of these outlet queues, which leads to the 16 outlet memories in FIG. 7. In addition to this, it must be possible for the 32 traffic outlets and the maintenance outlet to be reached individually, which represents 33 outgoing destinations and therefore requires 33 additional queues. But because of this individual access, writing a cell in one of these 33 outlet queues excludes it being written in any other queue. This means that it is possible for these queues to be located in a single outlet memory and that this memory can in addition be one of the 16 outlet memories previously mentioned. This outlet memory is the memory M1 of the unit RGM1. Finally, as indicated previously, each of the two sets of 16 outlets constitutes a group of outlets, complete with a queue, and writing a cell in one of these queues also excludes the cell being written in any other queue. The result is that these two outlet queues have also been located in the memory M1 which thus contains a total of 36 outlet queues.

We shall first of all examine the simplest case, the queue unit RGM2. As has been said, it comprises the memory M2, having a memory location for each different cell identity; in the example in this description, the cell identity is characterized by the address of its first subcell in the buffer memory BM (FIG. 1), and therefore the outlet memory M2 comprises the same number of locations as the buffer memory BM, each location of the memory M2 being capable of storing the address of the location of the memory BM corresponding to the first subcell of the next cell in the linked list constituting the queue. It also comprises a first cell pointer FBC, a last cell pointer LBC and various gates, a multiplexer MPX and a register R. We shall also refer to the overall description of the cell and outlet selection queue management logic COQML, in relation to input and output connections.

For writing a cell in a queue, the clock QCM (FIG. 6) generates an active signal WR, and, during the signal a pulse t1, followed by a pulse t2. The multiplexer MPX is directed by the signal WR so that the content of the last cell pointer LBC is transferred to the address register R. During the pulse t1, the register R is loaded with this address and addresses the memory M2 in write mode. The memory M2 is write enabled by the signal WE2 specifying that the address WISA must be added to the outlet queue of the outlet queue unit RGM2. This address WISA which is the cell reference identity, that is the address WISA at which the first subcell of the cell is stored in the buffer memory BM in FIG. 1, is written into the memory M2. During the pulse t2, the gate P12 is open, because the signal WE2 is present, so that the address WISA is written in the last cell pointer LBC. In this way, in general, on writing, the reference identity of each cell is added to a selected outlet queue, being stored in a location of the outlet memory whose address corresponds to the identity of the last linked cell of the identity of the incident cell, this identity then being written in the last cell pointer, in order to add the next cell.

It will be noted that the address WISA is written identically at the same time in every other outlet memory unit also selected (except for minor differences in respect of the unit RGM1).

For reading the reference identity of a cell, which is the address at which the first subcell of the cell is stored, the signal RE2 specifying that the cell reference identity requested must be read from the outlet memory unit RGM2, opens a gate pf2, which transmits the content of the first cell pointer FBC as a reference identity FSAO. The signal WR is inactive, but the pulses t1 and t2 are generated as for writing. The multiplexer MPX is directed to the first cell pointer FBC, so that the pulse t1 loads the content of this pointer in the address register R which then addresses the memory M2 in read mode (the signal WE2 being inactive). The content of the location read, indicated by NFSA in FIG. 7, is the reference identity of the next cell in the queue. The pulse t2 then opens the gate pnf2, enabled by the signal RE2, so that the information NFSA is written in the first cell pointer FBC, in the place of the transmitted address FSAO, to become later an address FSAO, in response to the next reference identity request concerning the outlet memory M2. In this way, in general, on reading, the reference identity of the first cell is supplied by the first cell pointer added to a selected outlet queue, and serves for reading from a location of the outlet memory, whose address corresponds to the identity of the first cell added, the identity of the next cell, this identity then being written in the first cell pointer, in order to supply the reference identity of the next cell in the queue.

The other outlet memory units, from RGM3, not shown, to RGM16 are identical and respond similarly to the selection signals WE3–WE16 and RE3–RE16, to the clock pulses WR, T1, T2 and the address WISA, and supply the address FSAO through an OR gate pof.

The outlet memory unit RGM1 is similar to those that have just been described, except that it contains 36 outlet queues instead of 1. To show this clearly, identical elements have the same references. For the 36 linked lists of these 36 queues, 36 first cell pointers and 36 last cell pointers are required. They are stored in a pointer memory MPM which comprises 36 locations, each containing, as shown, the first cell pointer FBC and the last cell pointer LBC of the same queue. This memory is addressed either by the signals QW1–QW6, or by the signals QR1–QR6, through a pointer address multiplexer MPXA, according to whether the signal WLR is active or inactive. The signals W1 and W2 being inactive, this addressing function operates in read mode and the content of the address location is supplied at the two outputs of the memory MPM. These two outputs of the memory MPM correspond exactly to the outputs of the two pointer registers of the unit RGM2, so that we then find identically a multiplexer MPX, an address register R enabled by the pulse t1, before the outlet memory M1.

When queueing a cell reference identity, the gate p11 acts in a similar fashion to gate p12 in unit RGM2. It operates at the same time under the effect of the clock pulse t2, when the outlet memory unit RGM1 is selected by the signal WE1. It then supplies the signal W1, which write enables the memory MPM. The information WISA is written in the location selected by the signals QW1–QW6, and more particularly in the part of this location corresponding to the last cell pointer LBC, the content of the part corresponding to the first cell pointer FBC being retained.

When reading the cell reference identity, the gate pf1 plays exactly the same role as the gate pf2 in the unit RGM2, transmitting the content of the first cell pointer FBC of the location of the memory MPM addressed in read mode by the signals QR1–QR6, from the moment that the unit RGM1 is selected by the signal RE1. Then, the gate pnf1 plays a role similar to that of the gate p12 in the unit RGM2. It operates at the same time under the effect of the clock pulse t2 when the outlet memory unit RGM1 is selected by the signal RE1. It then supplies the signal W2, which write enables the memory MPM. The information in the NFSA read from the memory M1 is written in the location selected by the signals QR1–QR6, and more particularly in the part of this location corresponding to the first cell pointer FBC, the content of the part corresponding to the last cell pointer LBC being retained.

It is obvious that queue structures other than those in FIG. 7 could also be employed for the same purposes and that those that have just been described represent only one example out of many on this subject. In particular, it is possible to consider using a single outlet memory to contain all the queues. In this case, a particular cell would be added to a number of queues in successive write cycles. In addition, to avoid "mixing" the linked lists of the different queues in the event of a point-to-multipoint cell transfer, it would be necessary to be able to distinguish the reference identities of the locations at which the subcell is stored in the buffer memory of the switching element, as has already been described and for this to attribute a different reference identity to each of the copies of a particular cell assigned to a particular outgoing destination.

Figure 8:
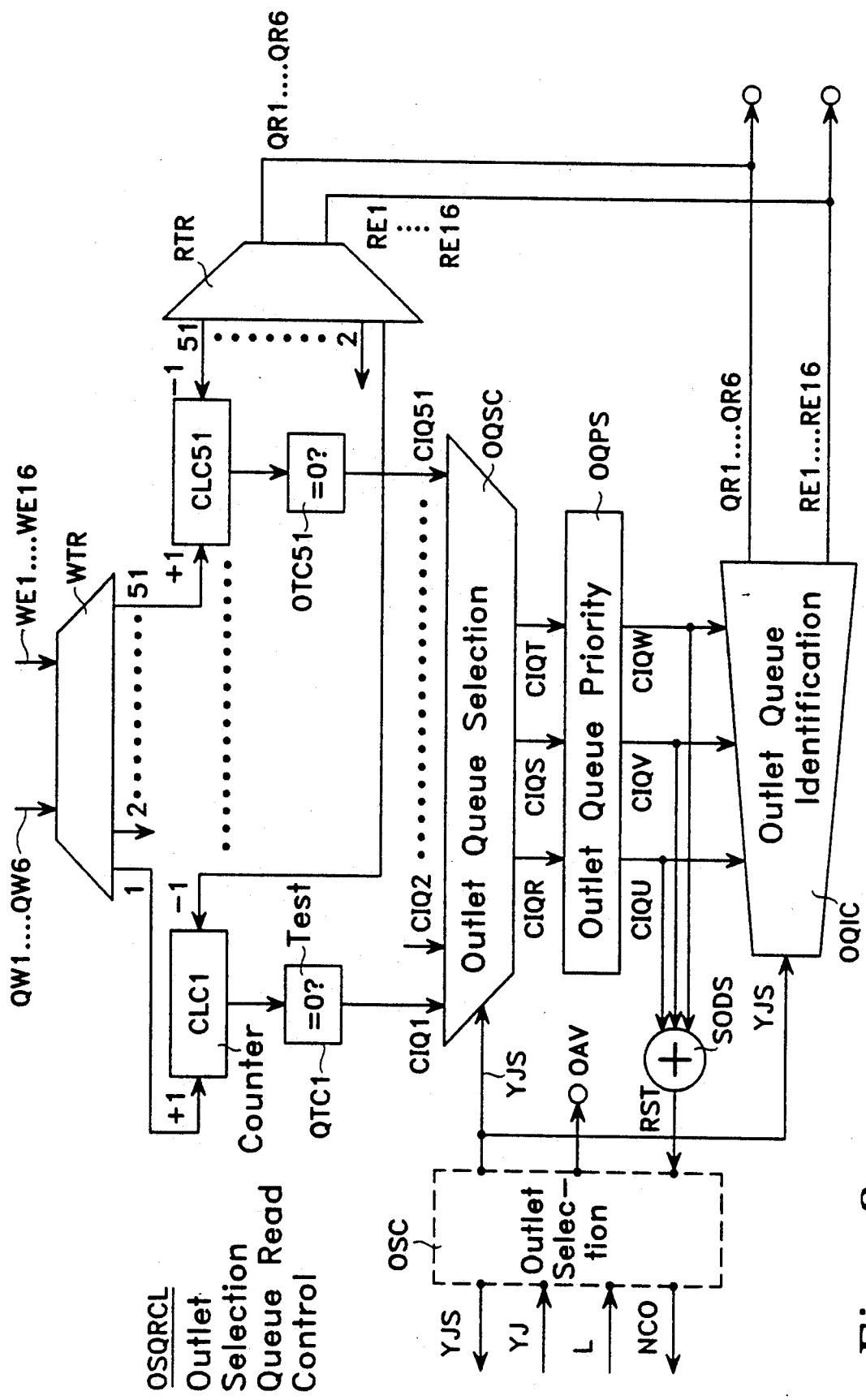
FIG. 8 is a detailed diagram of a method of implementing the cell and outlet selection queue management logic COQML in FIG. 6.

An embodiment of the cell and outlet selection queue management logic is shown in FIG. 8. As previously described, this logic OSQRCL receives the identity of an outlet YJ, accompanied by the signal L, which indicates that transmission of the last subcell of a cell is starting on this outlet, and consequently that a new cell must be assigned to this outlet. The function of the logic OSQRCL is to select a queue from a group of outlets that serves this outlet, by transmitting the queue read signals RE1-RE16 and QR1-QR6 which identifies it, to the queue unit in FIG. 7, which will respond with the reference identity FSAO (FIGS. 6 and 7) of a cell. At the same time, the logic OSQRCL supplies the identity YJS of the outlet to which the cell in question is assigned, accompanied by the signal NCO.

The logic OSQRCL comprises two parts, one of which an outlet selection part OSC will be described later, in two embodiments, referring to FIGS. 9 and 10, and the other of which is represented in detail in FIG. 8. The function of the outlet selection part OSC is to receive the outlet identity YJ and the signal L. In exchange, immediately or later, it supplies the outlet identity YJS.

The structure and operation of the circuits in FIG. 8 must be considered in three separate stages of the outlet processing procedure.

First, a counter is provided for each outlet queue, CLC1-CLC51 (it will be recalled that the queue unit OQU comprises 36+15=51 queues). Each of these counters is incremented by unity each time a cell is added to the queue; it is decremented by unity each time a cell is removed from the queue (assigned to an outlet for transmission). A test circuit associated with each counter, OTC1-OCT51 indicates whether the queue is empty or, on the contrary, contains at least one waiting cell, by the value of a corresponding test signal CIQ1-CIQ51. These counters are incremented each time a cell is added to a queue, in response to the signals QW1-QW6 and WE1-WE16 which identify the queue(s) to which a cell is added. A transcoding circuit WTR receiving these signals directly controls the counter incrementation inputs, denoted +1. Those which correspond to the outlet queues selected by the converted signals see their content incremented by unity. The counters are decremented each time a cell reference is read, at the moment when, as has already been mentioned and as will be seen further on, the signals QR1-QR6 and RE1-E16 identify the queue from which this reference identity will be read. A transcoding circuit RTR receiving these last signals consequently directly controls the counter decrementation inputs, denoted −1. The one corresponding to the queue identified by the converted signals sees its content decremented by unity.

Then, when an outlet YJ requests assignment of a new cell, this request is noted by the outlet selection part OSC. Immediately or later, this request will be served, in an outlet processing time slot during which the identity YJS supplied by the outlet selection part OSC is precisely YJ, this request giving rise to the presence of the signal OAV also supplied by the outlet selection part OSC.

Finally, outlet selection being completed, resulting in the supply of an outlet identity YJS, a queue is now selected which must supply the reference identity of a cell which will be assigned to the selected outlet. For this purpose, an outlet queue selection circuit OQSC is provided which receives the selected outlet identity YJS and the test signal CIQ1-CIQ51. This selection circuit OQSC, in the example in question, transmits up to three test signals from the signal CIQ1-CIQ51 to the selection outlets CIQR, CIQS and CIQT. It has been seen previously that a particular outlet could, in the example in question, and belong to a group of one or more normal traffic outlets, belong also to a distribution group comprising all the outlets of a direction as well as being individually selected for maintenance, so that a particular outlet can serve up to three outgoing directions, and therefore three corresponding queues. When the outlet has been selected so that a cell is assigned to it, it is then important to identify the outgoing directions that it serves, which is accomplished by the circuit OQSC. More precisely, the circuit OQSC transmits the test signals of up to three outlet queues, to the selection outlets CIQR, CIQS, CIQT, in a given order, which corresponds for example to the normal traffic, distribution and maintenance queues. One or more of these selection outlets thus receive a test signal indicating that the corresponding queue contains at least one cell. The purpose of the queue priority circuit OQPS is to select between them. It transfers a single test signal having such a meaning to only one of the three selection conductors CIQU, CIQV, CIQW. The outgoing direction which will be served by the selected outlet is thus chosen and identified. This choice will advantageously be made according to a defined priority, for example in the order: normal traffic distribution, maintenance. An OR gate SODS then supplies a signal RST to indicate that the selected outlet is actually going to receive a cell reference identity. In addition, an outlet queue identification transcoding circuit OQIC receives the signal present on one of the selection conductors CIQU, CIQV, CIQW, at the same time as the selected outlet identity YJS. In exchange, it supplies the signals QR1-QR6 and RE1-RE16 which identify, as has been seen previously, an outlet queue which is read and supplies the cell reference identity required, while the corresponding counter CLC1-CLC51 is decremented.

It can therefore be seen that the circuits in FIG. 8, when an outlet is selected, identify the outgoing destination served by this outlet and select one of them which has at least one cell to supply. It therefore remains to consider how an outlet is selected at a given time.

Figure 9:
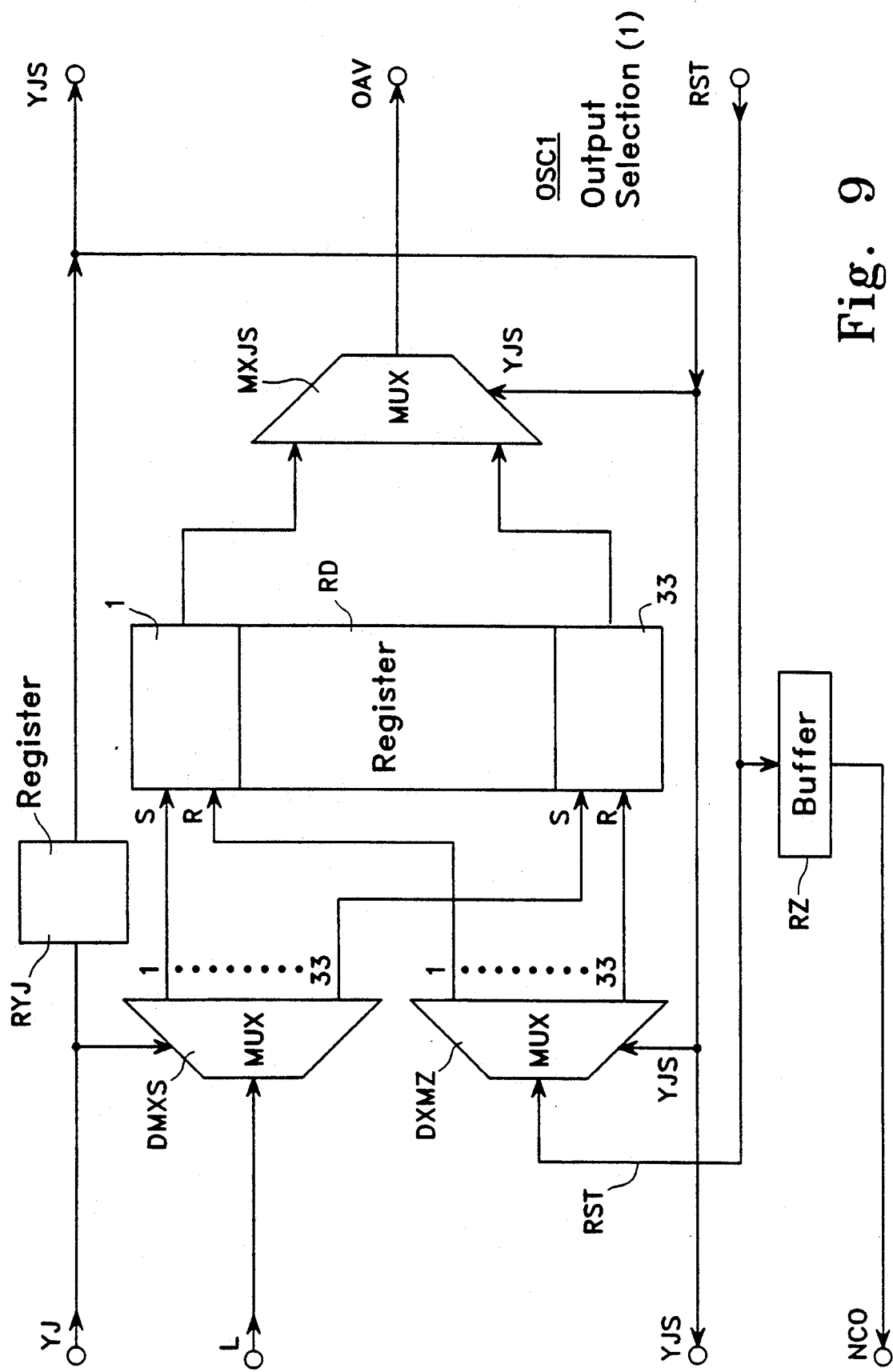
FIG. 9 is a diagram of one method of implementing the outlet selection circuit OSC in FIG. 8.

The first case that will be described is illustrated in FIG. 9 which represents a first embodiment OSC1 of the outlet selection part OSC in FIG. 8. In a first phase, the outlet identity YJ serves as an address to direct an outlet demultiplexer DMUS which transmits the signal L to one of its 33 outputs, which correspond to the 33 outlets of the switching element (FIG. 3). One of the 33 stages of a register RD thus receives the signal L at its input S. It is thus activated if the signal L is present, that is if the outlet in question is asking for a cell to transmit. This occurs at the start of each outlet time slot, whenever the signal L is present and the cell requests are in this way stored in the register RD, while the outlet identity YJ is stored temporarily in the register RYJ.

In a second phase which immediately follows the first, the register RYJ supplies the outlet identity YJS. Simultaneously, the multiplexer MXJS, directed by the identity YJS, tests the availability of the outlet YJS, so that its outlet OAV will be active if the stage corresponding to the identity YJS in the register RD is active; the presence of the signal OAV enables the request not yet satisfied of a cell for the outlet YJS, transmitted to the circuits of the logic OSQRCL in figure 8. If, in addition, one of the queues relating to the outgoing direction served by this outlet can supply a cell, the signal RST is transmitted. It is stored by the buffer stage RZ to transmit the signal NCO. It is also transmitted to a demultiplexer DMXZ which is directed by the outlet identity YJS. This signal is then applied to the reset input R of a stage of the register RD; the cell request stored in the register RD which has just been satisfied is thus cleared from the register RD for the outlet YJS, that is in this first case YJ.

However, if the outlet YJS, that is in this first case YJ, is not available in the register RD, the signal OAV being inactive inhibits the operation of the circuits in FIG. 8 and no selection or queue read is performed by the logic OSQRCL and the signal RST remains inactive. Conversely, if the signal OAV is active, but if no outgoing destination corresponding to the outlet YJ can supply a cell, the outlet in question, which has issued a cell request, maintains its request, because its availability has not been cleared from the register RD, the signal RST remaining inactive.

Such a method of implementation has the advantage of being simple, but it can give rise to correlation between the cell requests of the outlet and the addition of cells to queues. It is therefore desirable to provide additional means to achieve appropriate decorrelation. FIG. 10 shows a second embodiment OSC2 of the outlet selection part OSC providing for the introduction of a number of means aimed at such decorrelation.

In a first phase, again, the outlet identity YJ serves as an address to direct an outlet demultiplexer DMXS, which transmits the signal L to one of its 33 outputs, which correspond to the 33 outlets of the switching element (FIG. 3). One of the 33 stages of a register RD thus receives the signal L at its input S. It is thus activated, if the signal is present, that is if the outlet in question is asking for a cell to transmit. This occurs at the start of each outlet time slot, whenever the signal L is present. The register RD thus stores cell requests for the different outlets. In addition, in an outlet processing time division multiplex cycle, all the stages of the register RD will be respectively activated.

The selected outlet identity YJS, in this second case, is supplied by a source OSS which, for the moment, will be presented as a simple counter, the incrementation input of which receives a pulse for each outlet time slot.

In a second phase of the time slot at the start of which an outlet identity YJ leads to activation of a corresponding stage of the register RD, the source OSS supplies a selected outlet identity YJS which is not necessarily the same as the identity YJ and generally will be different from it.

The selected identity YJS is applied to an outlet availability test multiplexer MXJS which transmits on a conductor OAV the state of the stage of the register RD corresponding to the selected outlet YJS. If the selected outlet has issued a cell request not yet satisfied, the signal OAV has a level such that the operation of the circuits in FIG. 8 in the selection of an outgoing destination which will serve the selected outlet is allowed. If in addition one of the queues relating to the outgoing destinations served by this outlet can supply a cell, the signal RST is supplied. It is stored by the buffer stage RZ2 to supply the signal NCO as before. It is also transmitted to a demultiplexer DMXZ which is directed by the selected outlet identity YJS. This signal is then applied to the reset input R of a stage of the register RD; the cell request stored in the register RD, which has just been satisfied, is thus cleared from the register RD for the outlet YJS.

However, if the selected outlet has not issued a request, the signal OAV being inactive disables the operation of the circuits in FIG. 8, in a way which is not represented, and no selection or queue read is performed by the logic OSQRCL and the signal RST remains inactive. Conversely, if the signal OAV is active, but if none of the outgoing destinations corresponding to the selected outlet YJS can supply a cell, the outlet in question, which has issued a cell request, maintains this request, because its availability is not cleared from the register RD, the signal RST being inactive.

Figure 10:
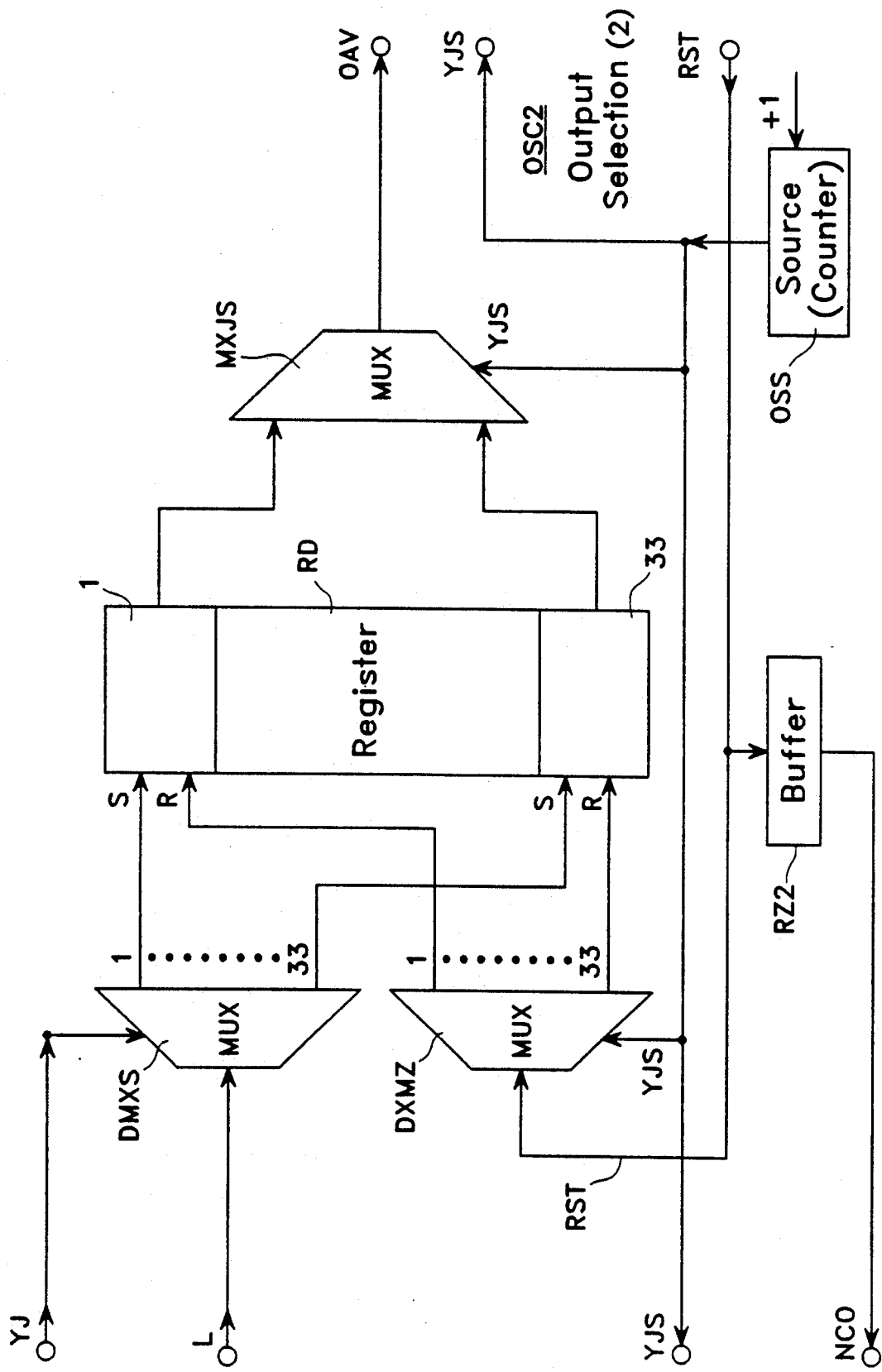
FIG. 10 is a diagram of a second method of implementing the outlet selection circuit OSC in FIG. 8.

It can thus be seen that the arrangements in figure 10 make it possible to separate into two independent (asynchronous) phases in time the processing of the cell requests issued by the outlets, which are simply stored in the register RD and the process of assigning cells to the selected outlets which depends on a source OSS.

If it is assumed that there are 33 outlets each having a time slot in a multiplexing cycle, in a given order, each can make a request and see it stored in the register RD during such a cycle. If the source OSS is a 33 position counter and therefore supplies the 33 outlet addresses, all the outlets will be able to obtain a cell assignment in the same cycle. But it is not necessary for the counter of the source OSS to supply the 33 outlet addresses in the same order and with the same origin except in relation to outlet multiplexing.

In this way, according to the invention, it is possible in particular to make provision for accomplishing one or more additional inactive steps on the counter of the source OSS, at an appropriate given time, so that, the order of processing the assignment of the outlets being unchanged, it is the origin which is shifted, regularly or irregularly, provided that the processing of all the outlets in a multiplex cycle is maintained. These additional steps, according to the invention, can be accomplished once in each outlet time division multiplex cycle. Additionally, according to the invention, the source OSS can incorporate means for disabling said additional steps once every N cycles, N preferably being neither a multiple nor a submultiple of the number of outlets. It is also possible, according to the invention, to use a random or pseudo-random number source to determine the number of said additional steps. Another possibility is to set the counter of the source OSS to a specified position, for example at the beginning of each outlet time division multiplex cycle. This specified value will advantageously be the random or pseudo-random number previously mentioned. It is even possible to envisage making a purely random selection of the outlets. Intermediate solutions can also be envisaged, according to the degree of decorrelation required between the arrival of the cell traffic at the inlets of the switching element and the distribution of this traffic over the different outlets available for groups of outlets each corresponding to an outgoing destination.

I claim:

1. Temporary information storage system comprising
    a buffer memory storing data structured as fixed or variable length blocks of data, each of said data blocks comprising one or more data elements, and a data block and outlet selection queue management logic comprising
  a plurality of queues for interlinking each of the data blocks to a respective destination of a plurality of destinations, such that when a data block is assigned to a destination it is sufficient to write its identity in the respective queue specific to this destination, and
data block selection means for assigning each of said data blocks to a respective individual outlet of a respective plurality of outlets associated with said respective destination, said data block selection means further comprising
  first means for identifying a specific said queue associated with said respective destination with which said respective individual outlet is associated,
  second means for obtaining from said specific queue an address of said each data block and
  third means for transferring said each data block to said respective individual outlet.

2. Temporary information storage system in accordance with claim 1, wherein
  said respective individual outlet is associated with a plurality of said destinations, and
  said data block selection means further comprises destination selection means for identifying a selected destination from said plurality of said destinations, said destination selection means further comprising
  fourth means for identifying all associated destinations associated with said respective individual outlet having at least one data block to transfer,
  fifth means responsive to said fourth means for identifying from said all associated destinations, a selected outgoing destination having at least one data block to transfer and
  sixth means responsive to said fifth means for establishing the identity of the queue associated with said selected destination.

3. Temporary information storage system in accordance with claim 2, wherein said destination selection means
  identifies candidate destinations having at least one data block to transfer by considering said destinations in an order based on destination types and
  selects said selected destination from said candidate destinations on the basis of said order.

4. Temporary information storage system in accordance with claim 1, wherein said destination selection means further comprise
  a counter for each destination, giving the number of data blocks to be transferred for said destination, and
  detection means for specifying whether said number is zero or different from zero.

5. Temporary information storage system in accordance with claim 1, wherein said data block and outlet selection queue management logic comprises
  outlet selection means operating in two successive phases during time slots of a repetitive cycle, said two successive phases consisting of a first phase for receiving from a requesting individual outlet a request that a data block must be assigned to it and a second phase for supplying the identity of a selected outlet to which a data block must be assigned.

6. Temporary information storage system in accordance with claim 5, wherein said selected outlet identity supplied in a second phase is that of said requesting individual outlet of the immediately preceding first phase.

7. Temporary information storage system in accordance with claim 5, wherein said selected outlet identity is supplied by a source, such that the selected outlet identity is defined independently of the identity of said requesting individual outlet.

8. Temporary information storage system in accordance with claim 7, wherein said source is a counter with a number of active positions equal to the number of said time slots and which passes through all its positions at the rate of one per time slot in said cycle.

9. Temporary information storage system in accordance with claim 8, wherein said source counter accomplishes one or more additional steps, forwards or backwards, at regular or irregular intervals.

10. Temporary information storage system in accordance with claim 9, wherein said source counter accomplishes one or more additional steps, forwards or backwards, once in each of said cycles.

11. Temporary information storage system in accordance with claim 10, wherein the accomplishment of said additional steps is disabled in one cycle out of N, where N is neither a multiple nor a sub-multiple of the number of time slots in a cycle.

12. Temporary information storage system in accordance with claim 9, wherein the number of said additional steps is on each occasion supplied by a source of successive random or pseudo-random numbers.

13. Temporary information storage system in accordance with claim 8, wherein said source counter is set to a specified position at the start of each cycle.

14. Temporary information storage system in accordance with claim 13, wherein said specified position is supplied form or taking account of a source of successive random or pseudo-random numbers.

15. Temporary information storage system in accordance with claim 7, wherein said selected outlet identity source is a source of successive random or pseudo-random numbers.

16. Temporary information storage system in accordance with claim 1, wherein said queues are FIFO queues.

17. Temporary information storage system in accordance with claim 1, wherein
  each of said queues is implemented by a respective linked list of data block identities stored in a respective memory used by one or more of said queues, and
  the number of said respective memories is at least equal to the maximum number of outlet groups to which a copy of a particular data block point-to-multipoint transfer.

18. Temporary information storage system in accordance with claim 3, wherein said destination selection means further comprises
  a counter for each destination, giving the number of data blocks to be transferred for said destination, and
  detection means for specifying whether said number is zero or different from zero.

19. Temporary information storage system in accordance with claim 18, wherein said data block and outlet selection queue management logic comprises outlet selection means operating in two successive phases during time slots of a repetitive cycle, said two successive phases consisting of a first phase for receiving from a requesting individual outlet a request that a data block must be assigned to it and a second phase for supplying the identity of a selected outlet to which a data block must be assigned.

20. Temporary information storage system in accordance with claim 19, wherein said selected outlet identity supplied in a second phase is that of said requesting individual outlet of the immediately preceding first phase.

21. Temporary information storage system in accordance with claim 19, wherein said selected outlet identity is supplied by a selected outlet identity source, such that the selected outlet identity is defined independently of the identity of said requesting individual outlet.

22. Temporary information storage system in accordance with claim 21, wherein said source is a counter with a number of active positions equal to the number of said time slots and which passes through all its positions at the rate of one per time slot in said cycle.

23. Temporary information storage system in accordance with claim 22 wherein said source counter accomplishes one or more additional steps, forwards to backwards, at regular or irregular intervals.

24. Temporary information storage system in accordance with claim 23, wherein said source counter accomplishes one or more additional steps, forwards or backwards, once in each of said cycles.

25. Temporary information storage system in accordance with claim 24, wherein the accomplishment of said additional steps is disabled in one cycle out of N, where N is neither a multiple or a sub-multiple of the number of time slots in a cycle.

26. Temporary information storage system in accordance with claim 25, wherein the number of said additional steps is on each occasion supplied by a source of successive random or pseudo-random numbers.

27. Temporary information storage system in accordance with claim 22, wherein said source counter is set to a specified position at the start of each cycle.

28. Temporary information storage system in accordance with claim 27, wherein said specified position is derived from successive random or pseudo-random numbers.

29. Temporary information storage system in accordance with claim 21, wherein said selected outlet identity source is a source of successive random or pseudo-random numbers.

30. Temporary information storage system in accordance with claim 20, wherein said queues are FIFO queues.

31. Temporary information storage system in accordance with claim 26, wherein said queues are FIFO queues.

32. Temporary information storage system in accordance with claim 28, wherein said queues are FIFO queues.

33. Temporary information storage system in accordance with claim 29, wherein said queues are FIFO queues.

34. Temporary information storage system in accordance with claim 20, wherein
each of said queues is implemented by a respective linked list of data block identities stored in a respective memory used by one or more of said queues, and
the number of said respective memories is at least equal to the maximum number of outlet groups to which a copy of a particular data block may be transferred in the case of a point-to-multipoint transfer.

35. Temporary information storage system in accordance with claim 26, wherein
each of said queues is implemented by a respective linked list of data block identities stored in a respective memory used by one or more of said queues, and
the number of said respective memories is at least equal to the maximum number of outlet groups to which a copy of a particular data block may be transferred in the case of a point-to-multipoint transfer.

36. Temporary information storage system in accordance with claim 28, wherein
each of said queues is implemented by a respective linked list of data block identities stored in a respective memory used by one or more of said queues, and
the number of said respective memories is at least equal to the maximum number of outlet groups to which a copy of a particular data block may be transferred in the case of a point-to-multipoint transfer.

37. Temporary information storage system in accordance with claim 29, wherein
each of said queues is implemented by a respective linked list of data block identities stored in a respective memory used by one or more of said queues, and
the number of said respective memories is at least equal to the maximum number of outlet groups to which a copy of a particular data block may be transferred in the case of a point-to-multipoint transfer.

* * * * *